(12) United States Patent
Hart et al.

(10) Patent No.: US 11,250,501 B2
(45) Date of Patent: Feb. 15, 2022

(54) SCALABLE ARCHITECTURE FOR MANAGING TRANSACTIONS

(71) Applicant: Capital One Services, LLC, McLean, VA (US)

(72) Inventors: Colin Hart, Arlington, VA (US); Jason Ji, Reston, VA (US); Alexandra A. Colevas, Arlington, VA (US); Steven Quadros, New York, NY (US); Adnan Malik, Voorhees, NJ (US); Jared M. Alexander, Vienna, VA (US); Scott Golder, Columbia, MD (US); Allison Abbott, Washington, DC (US); Matthew Horton, Arlington, VA (US); Emma Sagan, Washington, DC (US); Kevan Emmott, Arlington, VA (US); Christine Ann Berglund, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/107,480

(22) Filed: Aug. 21, 2018

(65) Prior Publication Data

US 2020/0065894 A1    Feb. 27, 2020

(51) Int. Cl.
   *G06Q 40/02*   (2012.01)
   *G06N 20/00*   (2019.01)
   *G06F 16/23*   (2019.01)

(52) U.S. Cl.
   CPC ............ *G06Q 40/02* (2013.01); *G06F 16/23* (2019.01); *G06N 20/00* (2019.01)

(58) Field of Classification Search
   None
   See application file for complete search history.

(56) References Cited

U.S. PATENT DOCUMENTS

| | | | |
|---|---|---|---|
| 7,966,329 | B1 | 6/2011 | Rukonic et al. |
| 8,510,677 | B2 | 8/2013 | van Os |
| 10,325,224 | B1 | 6/2019 | Erenrich et al. |
| 10,402,896 | B1 | 9/2019 | Lopez et al. |
| 11,132,661 | B1 | 9/2021 | White, III et al. |

(Continued)

FOREIGN PATENT DOCUMENTS

WO    02/082288    10/2002

OTHER PUBLICATIONS

Treleaven, et al., Computational Finance, published in IEEE Computer (vol. 43 , Issue: 12 , Dec. 2010 ) (Year: 2010), entire document pertinent.*

(Continued)

*Primary Examiner* — Gregory S Cunningham, II
(74) *Attorney, Agent, or Firm* — DLA Piper LLP (US)

(57) ABSTRACT

Provided, in an aspect, is a system for managing transactions from a financial services computer network. The system has a scalable architecture, and includes a database, one or more processors, a plurality of experience matchers, and a transaction hub. Each experience matcher is associated with a different experience set type, and can receive a transaction list and return an identified experience set. The transaction hub can communicate with multiple experience matchers, and can receive experience sets from the matchers after sending them a list of transactions.

20 Claims, 22 Drawing Sheets

(56) References Cited

U.S. PATENT DOCUMENTS

| | | | |
|---|---|---|---|
| 2007/0106582 A1 | 5/2007 | Baker et al. | |
| 2009/0222364 A1* | 9/2009 | McGlynn | G06Q 40/02 |
| | | | 705/30 |
| 2009/0222365 A1* | 9/2009 | McGlynn | G06Q 30/02 |
| | | | 705/30 |
| 2011/0246299 A1 | 10/2011 | Satyavolu et al. | |
| 2011/0258005 A1 | 10/2011 | Fredericks et al. | |
| 2011/0320325 A1 | 12/2011 | Preston et al. | |
| 2012/0094639 A1 | 4/2012 | Carlson et al. | |
| 2013/0046717 A1 | 2/2013 | Grigg et al. | |
| 2013/0246125 A1 | 9/2013 | DiGioacchino et al. | |
| 2014/0278875 A1 | 9/2014 | Ganesh et al. | |
| 2014/0282016 A1 | 9/2014 | Hosier, Jr. | |
| 2015/0088704 A1 | 3/2015 | Votaw et al. | |
| 2015/0088714 A1 | 3/2015 | Votaw et al. | |
| 2015/0186802 A1 | 7/2015 | Hulbert | |
| 2015/0242961 A1* | 8/2015 | Caskey | G06Q 40/12 |
| | | | 705/30 |
| 2015/0287134 A1 | 10/2015 | Budzinski | |
| 2016/0078566 A1* | 3/2016 | Farrell | G06Q 10/10 |
| | | | 705/30 |
| 2016/0098789 A1 | 4/2016 | Berntsson et al. | |
| 2016/0162810 A1 | 6/2016 | Howe | |
| 2016/0371689 A1 | 12/2016 | Brown et al. | |
| 2017/0024799 A1 | 1/2017 | Bhatt et al. | |
| 2017/0034305 A1* | 2/2017 | Blevins | H04L 67/42 |
| 2017/0053363 A1 | 2/2017 | Maheshwari et al. | |
| 2017/0169497 A1 | 6/2017 | Lee et al. | |
| 2017/0193550 A1 | 7/2017 | Misra et al. | |
| 2018/0018734 A1* | 1/2018 | Ho | G06Q 40/06 |
| 2019/0108546 A1 | 4/2019 | Goodyear et al. | |

OTHER PUBLICATIONS

Hua, et al., A Brief Review of Machine Learning and Its Application, Published in: 2009 International Conference on Information Engineering and Computer Science, entire document pertinent (Year: 2009).*

Treleaven, et al., Computational Finance, published in IEEE Computer (vol. 43 , Issue: 12 , Dec. 2010 ), entire document pertinent (Year: 2010).*

T. K. Hazra, "Parallel computing," in IEEE Potentials, vol. 14, No. 3, pp. 17-20, Aug.-Sep. 1995, doi: 10.1109/45.464689. (Year: 1995).*

Author's anonymous, Automatic and Customizable Cash Management Visualizer, 2008, retrieved from the IP.com Prior Art Database, https://ip.com/IPCOM/000176197 (Year: 2008).*

Wikipedia, "Google Now", Wikimedia Foundation, Inc., https://en.wikipedia.org/wiki/Google_Now, Jul. 7, 2018, 5 pages.

Quicken Inc., "Quicken Personal Finance, Money Management, Budgeting," www.quicken.com/how-it-works, printed on Apr. 22, 2018.

Intuit, Inc., "Mint: Money Manager, Bills, Credit Score & Budgeting," www.mint.com, printed on Apr. 19, 2018.

Intuit, Inc., "Mint Bill Pay: Bill Reminders, Bill Tracking, Online Bill Payment," www.mint.com/how-mint-works/bills#toc, printed on Apr. 19, 2018.

Intuit, Inc.," Mint: Simple Categorization," www.mint.com/how-mint-works/categorization#toc, printed on Apr. 19, 2018.

Intuit, Inc., "Mint: Money Manager, Personal Finance, and Budgeting," www.mint.com/how-mint-works, printed on Apr. 19, 2018.

IRS, "Internal Revenue Bulletin: 2004-31", Aug. 2, 2004, 140 pages.

Citibank, N.A., "Merchant Category Codes: Treasury and Trade Solutions", 2015, 37 pages.

* cited by examiner

On the Calendar, you'll see your total spending plotted day by day to help you understand *when* you spend the most. You'll also see the corresponding moments listed below.

SCALABLE ARCHITECTURE FOR MANAGING TRANSACTIONS

BACKGROUND

Systems for managing personal finances, for example expenses, may rely on a series of individual or discrete transactions. Transactions may be automatically imported from a financial services account, such as a credit card account, entered manually by a user, or otherwise obtained by the system. Once the transactions are obtained, the system may display them individually on a display screen.

A transaction may have a merchant category code (MCC) associated with it. The MCC is an ISO standard that can be assigned to a merchant by a credit card company. Some systems for managing personal finances may allow displaying the MCC with each transaction. For example, a taxi payment may be categorized as "transportation," and a movie ticket purchase may be categorized as "entertainment" according to a pre-assigned merchant category code. When such categorizations are available, either as automatically supplied by a financial institution or as entered manually by a user (the user-entered codes may be different from standard MCCs, unless the system only allows a user to enter a standard MCC), some systems may further allow displaying subgroups of transactions based on their category codes. This may allow a user to see what merchant categories involve the most expenses. Banks and other financial institutions may group transactions using merchant category codes for the purpose of defining rules and restrictions around those transactions. Consequently, there may be a number of categories that are redundant or unhelpful to users, since MCCs are primarily focused on merchants and are limited to describing transactions in isolation from their context. Lack of their user focus and lack of their user customization further limit the usefulness of MCCs.

In addition, transactions are often ordered and displayed by financial management software based on their dates of settlement. As such, the displayed order of transactions that a user sees might be different from the order in which the user has actually made the transactions. Further adding to the challenges of interpreting a list of transactions, unrelated transactions might be ordered next to each other while the related ones might be interspersed with many unrelated ones in between them, either due to imprecise and inaccurate chronology or due to the natural way in which users make purchases.

Some systems may allow a user to view total amounts spent during a specified period, or to view the total amounts spent during a period from transactions with certain merchant category codes. However, users may find it difficult to understand from these systems how their money is spent beyond the individual transactions and merchant category codes, in addition finding it challenging to draw conclusions from the standard (often incorrect) chronology of the transactions.

SUMMARY

In an aspect of the present disclosure, a system with a scalable architecture for managing transactions from a financial services computer network includes a database; one or more processors; a plurality of experience matchers; and a transaction hub. The experience matchers may be associated with a different experience set type, each of the experience matchers being configured for execution by the one or more processors to receive a list of transactions; identify, within the list of transactions, one or more experience sets having an associated experience set type, wherein each experience set encompasses one or more transactions related (e.g., temporo spatially, logically) to each other from the list of transactions; and return the one or more identified experience sets. On the other hand, the transaction hub may be configured for execution by the one or more processors to receive a transaction stream from a financial services computer network; send a list of transactions generated from the transaction stream to a plurality of experience matchers; receive one or more identified experience sets from the plurality of experience matchers; and store the identified experience sets in the database.

In some embodiments of the system, each of the experience matchers is configured for execution by the one or more processors to further determine, and return to the transaction hub, a match score for each of the one or more identified experience sets. The transaction hub may be configured for execution by the one or more processors to further prioritize allocation of a transaction into an identified experience set based on the match scores. The match score is determined based on a factor such as a transaction time range, transaction merchant codes, transaction physical proximity, transaction temporal proximity, or a combination of such factors. In some embodiments of the system, each of the experience matchers is configured for execution by the one or more processors to perform the search and return operations in real time with a delay of less than ten minutes after receiving the list of transactions. The transaction hub may be configured for execution by the one or more processors to receive the transaction stream in real time with a delay of less than ten minutes after a transmittal of a new transaction to be appended to the list of transactions. The system may be configured to be modified by addition of new independent experience matchers. The new experience matchers may be created based on user research, or via machine learning.

In an aspect of the present disclosure, a method for forming an experience set from a transaction list from a financial services computer network using a scalable system architecture includes obtaining by a transaction hub a past transaction list from a financial services computer network; receiving by the transaction hub a transaction from the financial services computer network; updating by the transaction hub the past transaction list into a current transaction list by adding in the transaction; sending by the transaction hub the current transaction list to each of a plurality of independent experience matchers; analyzing by each of the experience matchers the current transaction list to identify an experience set; receiving by the transaction hub an identified experience set from one of the experience matchers, wherein the experience set contains at least two transactions from the current transaction list; and storing the experience set by the transaction hub in a database.

In some embodiments of the method, the current transaction list contains transactions from a predetermined time range. The time range may be thirty days. In some embodiments, the time range may be selected (e.g., 60 days, 50 days, 40 days, 30 days, 20 days, 10 days, 5 days, 24 hours). The transaction may be received in real time with a delay of less than ten minutes. The matching experience set may also be received in real time with a delay of less than ten minutes. The method may further include receiving from each of the experience matchers a match score. The match score may be determined based on transaction time, transaction type, transaction distance, and transaction interval. The method may also include revising the plurality of experience matchers, or revising the experience set, which may be revised via machine learning.

In one aspect of the present disclosure, a system for generating a humanized experience set from a list of transactions from a financial services computer network includes a transaction database; one or more processors; and memory operably linked to the one or more processors, wherein the memory has disposed in it a scalable system of software architecture. The architecture, in this aspect, includes a transaction hub and a plurality of independent experience matchers. The transaction hub may have instructions executable by the one or more processors to receive a transaction stream from a from a financial services computer network in real time with a delay of less than ten minutes after a recent transaction; send a list of transactions generated from the transaction stream to a plurality of independent experience matchers; receive one or more identified experience sets and their match scores from the experience matchers, wherein each experience set encompasses one or more transactions from the list of transactions; prioritize allocation of a transaction into an identified experience set based on the match scores, thereby obtaining a prioritized identified experience set; and store the prioritized identified experience set in the transaction database. The plurality of independent experience matchers may have instructions executable by the one or more processors to receive a list of transactions from the transaction hub; analyze the list of transactions to identify one type of experience set; determine a match score for each identified experience set, wherein the match score is determined based on a factor such as a transaction time range, transaction merchant codes, transaction physical proximity, transaction temporal proximity, or a combination of such factors; and return one or more identified experience sets, each of a common experience set type, and their one or more match scores to the transaction hub.

In an aspect of the present disclosure, a method for improved visualization of transaction data from a financial services computer network includes receiving, at a computing device, a plurality of experience sets; presenting, on a display of the computing device, a graphical user interface (GUI); and updating the GUI in response to receiving a revision to the plurality of experience sets. In this aspect, each experience set includes an experience set name, an experience set date (or date range), an experience set time span, and an experience set amount, whereas each experience set contains one or more transactions that relate to each other (e.g., temporospatially, logically), while each transaction includes a transaction place, a transaction time, and a transaction amount; Again in this aspect, the GUI includes a scrollable list including at least a portion of the experience set name for experience sets within a selected time period, the scrollable list including a chronological order based on the experience set date (or the initial date of a date range, or the last day of a date range, or another representative date of the date range, such as mean date, median date, weighted average date, etc.) for each of the experience sets; and a calendar for the time period showing, for each day, a graphical element indicative of a total of all experience set amounts in that day. When an experience set has transactions that occur within a date range, the term "experience set date" is used to refer to a representative date (e.g., a date that is nearest to the middle of the date range, in some embodiments, unless otherwise specified).

In some embodiments, the method further includes displaying on the graphical user interface of the computing device, alongside the portion of the experience set name for each of the experience sets, one or more experience details such as an experience set location, an experience set time span, an experience set amount that corresponds to a total of all transaction amounts in the experience set, a list of three transaction names for transactions with greatest transaction amounts in the experience set, or a combination of such details. In some embodiments, the method further includes, in response to a user scrolling through the scrollable list, highlighting in the calendar a graphical element that corresponds to a topmost experience set visible on the display screen. In some embodiments, the method further includes, in response to a user tapping on a graphical element in the calendar, automatically scrolling the scrollable list to place a corresponding experience set to be visible on the display screen above other experience sets.

In some embodiments, the method further includes, in response to a user input, displaying a territorial map showing each transaction place encompassed by a chosen experience set. In some embodiments, the method further includes, in response to a user input, excluding each predefined non-discretionary transaction from each experience set, and accordingly revising the calendar. The method may also include, in response to a user input, modifying an experience set. Methods that further include receiving from a user feedback regarding an experience set are also encompassed in the aspect. In some embodiments, an experience set includes transactions made within a preset distance to a user's default location and within a preset time window around noon. In some embodiments, an experience set includes transactions made farther than a preset distance from a user's default location. In some embodiments, an experience set includes transactions made within a preset distance to a user's default location and within a preset time window around 9 p.m. In some embodiments, an experience set includes transactions made within a preset time window; as an example, around 11-2 p.m. for a "lunch." Various other preset time windows may also be used.

According to an aspect of the present disclosure, a method implemented on a computer for humanizing in a graphical user interface presentation of transaction data from a financial services computer network includes receiving, at a computing device, a plurality of experience categories; presenting on a display of the computing device a graphical user interface (GUI); and updating the GUI in response to receiving a revision to the plurality of experience sets. In this aspect, each experience category has an experience category name and an experience category amount; each category contains one or more experience sets of a common experience set type that fall within a selected time period; each experience set has an experience set name, an experience set date (or date range), an experience set time span, and an experience set amount; each experience set further contains one or more transactions that relate (e.g., temporospatially, logically) to the experience set; and each transaction has a transaction place, a transaction time, and a transaction amount. Again in this aspect, the GUI includes a scrollable list having at least a portion of the experience category name for each of the experience categories within the time period; and a breakdown schematic for the time period showing, for each experience category, a distinct graphical element indicative of the experience category amount in the time period.

In some embodiments, the method further includes, in response to a user input, changing the time period, and accordingly updating both the scrollable list and the breakdown schematic. In some embodiments, the method further includes, in response to a user input, displaying the one or more experience sets encompassed by a category. The method may also include, in response to a user input, displaying a territorial map showing each transaction place encompassed by a chosen experience category.

In some embodiments, the method further includes, in response to a user input, excluding each predefined non-discretionary transaction from each experience category and breakdown schematic. The method may further include, in response to a user input, modifying an experience category. In some embodiments, the method further includes receiving feedback from a user regarding an experience category. The method may further include, in response to a user input, changing an experience set name, removing a transaction from an experience set, adding another transaction to an experience set, merging an experience set with another experience set, or a combination of such actions.

In one aspect of the present disclosure, a computing device has a display screen, the computing device being configured to display on the screen a plurality of experience sets, additionally being configured to display on the screen a calendar schematic showing a disk corresponding to each experience set, and additionally being configured to display on the screen a breakdown schematic showing a graphical element corresponding to each category that includes at least one experience set, in which each of the plurality of experience sets, the calendar schematic, and the breakdown schematic is selectable and editable by a user.

In an aspect of the present disclosure, a method for improved management of transaction data from a financial services computer network includes receiving, from the financial services computer network, details for a first purchase made by a user on a start date; detecting that the first purchase is a trigger purchase; obtaining secondary details for the first purchase from a data source external to the financial services computer network, wherein the secondary details for the first purchase indicate that the first purchase is associated with an event on a target date later than the start date; receiving, from the financial services computer network, details for a second purchase made by the user on the target date; receiving details for one or more other purchases made after the first purchase and before the second purchase; determining that the second purchase and the first purchase are part of a common experience set by comparing the details for the second purchase with at least one of the details for the first purchase and the secondary details for the first purchase, wherein the one or more other purchases are determined not to be part of the common experience set; and storing the common experience set to a database.

In some embodiments of the method, the first purchase is detected as a trigger purchase by comparing the first purchase details with predetermined attributes from a trigger transaction database. The method may further include receiving details for one or more additional purchases made after the second purchase, and categorizing the one or more additional purchases as part of the common experience set. The method may also include determining that each of the additional purchases is related to the first purchase by comparing each of the additional purchase details with the first purchase details, with the first purchase secondary details, or with both the first purchase details and the first purchase secondary details. The first purchase secondary details may further include an end date after which no purchases are categorized as part of the common experience set. In some embodiments, the first purchase details and the second purchase details are received concurrently with each other. The first purchase details and the second purchase details may also be received separately and in real time as each of the first purchase and the second purchase is made.

In some embodiments, the first purchase is detected as a trigger purchase when the first purchase details indicate that the first purchase corresponds to purchasing a flight ticket, purchasing a cruise ticket, purchasing a train ticket, purchasing a bus ticket, reserving a rental car, reserving an event space, booking a hotel space, booking a motel space, or booking a hostel space. The first purchase secondary details may be obtained via email scraping (e.g., after obtaining an authorization). The first purchase secondary details may also be obtained from a third-party supplier. The target date may be one day to one year after the start date (e.g., 2 days, 10 days, 1 month, 2 months, 6 months). In some embodiments, the target date may be more than a week and less than two months after the start date.

In an aspect of the present disclosure, a method for improving categorization of transactions by money-management software includes receiving a first transaction made on a first date from a financial services computer network; detecting that the first transaction is a trigger transaction (e.g., the first of a set of transactions that form a common experience set) by matching first transaction attributes to predetermined trigger transaction attributes; obtaining forecast data for the first transaction from a forecast agent, wherein the forecast data include a second date; receiving, after a period encompassing a plurality of unrelated transactions, a second transaction made on the second date; determining that the second transaction and the first transaction are part of an experience set by comparing the forecast data to second transaction attributes; and storing the experience set to a database.

In some embodiments, the method further includes receiving input from a user indicating that the first transaction is a trigger transaction. The forecast data in the method may further include a place. The method may also include receiving input from a user to modify the forecast data. In some embodiments, the method includes displaying a confirmation after the second transaction. In some embodiments, a reminder is displayed before the second date. The method may also include acquiring a choice from a user regarding the second transaction, and determining that the second transaction is related to the first transaction based on the choice. In some embodiments of the method, summary of the experience set can be generated.

In one aspect of the present disclosure, a non-transitory computer-readable medium for forming an experience set from a plurality of transaction data with instructions stored on the medium that when executed by a processor perform steps that include receiving a first transaction; detecting that the first transaction is a trigger transaction, wherein the first transaction is detected as a trigger transaction when the first transaction corresponds to purchasing a flight ticket, purchasing a cruise ticket, purchasing a train ticket, purchasing a bus ticket, reserving a rental car, reserving an event space, booking a hotel space, booking a motel space, or booking a hostel space; obtaining contextual data for the first transaction, wherein the contextual data is obtained from a third-party supplier; receiving, after more than a week encompassing a plurality of unrelated transactions, a second transaction; determining by using the contextual data that the second transaction and the first transaction are part of an experience set; and displaying a summary of the experience set, wherein the summary includes each transaction and total transaction amount. The displayed summary may also include a descriptive name for the experience set.

The embodiments described above have various advantages. For example, instead of a bare list of distinct transactions, groups of transactions representing common experiences are presented, which makes the presentation of transactions more similar to how humans think about their money. For instance, instead of distinct "transportation," "entertainment," and "dining" transactions, a user may be presented with a "night out" experience, which would encompass the individual transactions. That makes it easier for a user to understand when and how expenses are incurred. In addition, providing a list of transactions according to their authorization times, instead of settlement dates, enables a more accurate and precise understanding of the transactions. Grouping of transactions in a user-centric way, rather than a merchant-centric way, improves users' ability to manage their expenses. Furthermore, because the created experience sets may incorporate data beyond what may be available in an isolated transaction, such as the context of the transaction, its precise time, its precise location, its relationship to other transactions, its secondary attributes that may relate to future plans, and an experience set's higher order relationship to other experience sets, users gain insights that they would not have been able to gain from pre-existing lists of transactions.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

According to some embodiments of the present disclosure, a system for managing transactions from a financial services computer network allows users to better understand when and how their money is spent by, for example, intelligently grouping distinct transactions into human-relatable "experience sets." An "experience set" is a group of transactions that are related to each other in some manner and that collectively reflect an experience of a user. Because humans think of their expenses relative to experiences, embodiments of the present disclosure can allow users to better understand when and how their money is spent in the context of experiences, without needing to review, tag, or categorize individual transactions. That way, instead of having to read through a list of distinct transactions, users can view a timeline of their experiences. As an example, if a user takes a taxi ride in the evening, goes to a restaurant, and goes to a movie afterward, these transactions can be grouped into a "night out" experience set. Similarly, a trip across the country can be displayed as a "trip," and a visit to a restaurant and an ice cream shop around noon can be grouped into a "lunch" experience set. As such, each experience set contains one or more transactions that are related to each other, for example temporo spatially or logically, and reflect an experience of a user. An example of a logical relationship is the one between a purchase and the return (e.g., refund) transaction for that purchase. An experience set may group transactions based on time, location, or other factors used to relate multiple transactions.

According to some embodiments of the present disclosure, a scalable system architecture can allow searching for and identifying multiple different kinds of experience sets, using independent business logic for each kind of experience set. The system may use a transaction hub and multiple independent experience matchers. Experience matchers can be readily added or modified to support many different types of experiences. As an example of an experience matcher, a "meals" experience matcher might search for transactions that are within a range of times (e.g., 6 a.m. to 10 a.m.), have certain merchant category codes (e.g., restaurants), are in physical proximity to each other (e.g., based on merchant address), and occur in temporal proximity to each other (e.g., within one hour). Based on the time range, the experience matchers can tag the group of transactions as a breakfast, lunch, or dinner. As more experience types are identified, such as by user research or machine learning, new experience matchers can be easily added to detect these new experiences. Since each experience matcher operates independently from the others and contains its own independent business logic, this provides a scalable solution to the problem of adding new experience matchers over time.

Figure 1:
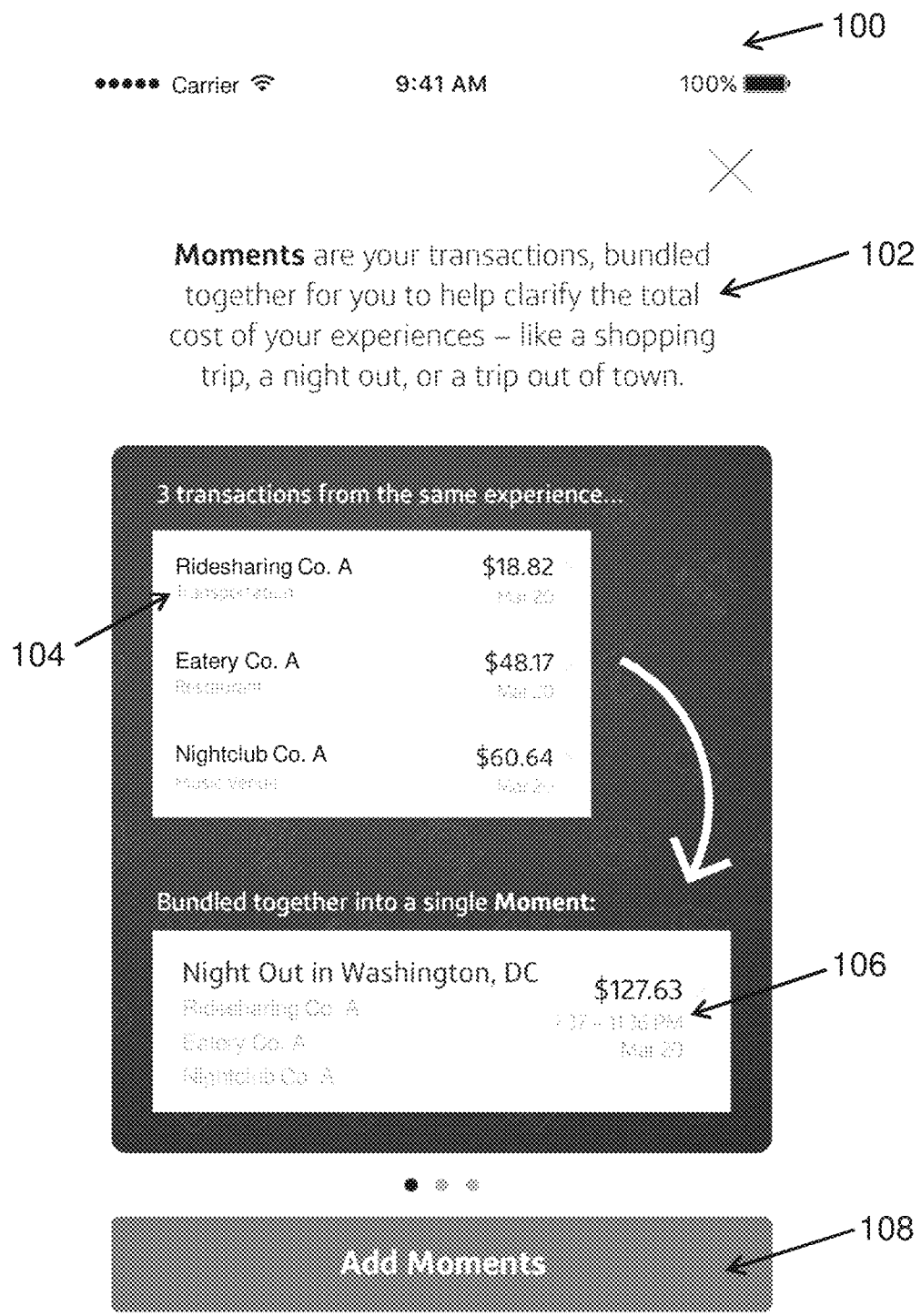
FIG. 1 illustrates a graphical user interface (GUI) for introducing the grouping of transactions into an experience set that may be used in a system for managing transactions from a financial services computer network, according to some embodiments of the present disclosure.

FIG. 1 shows an illustrative graphical user interface (GUI) 100 that may be implemented within a system for managing transactions from a financial services computer network, according to some embodiments of the present disclosure. As shown, GUI 100 includes explanatory message 102, at least one transaction 104, experience set 106, and control 108. In the example shown, there are three transactions, for each of which, a name, a merchant category, an amount, and a date are shown. The merchant categories of the transactions in this example are "transportation," "restaurant," and "music venue." These three transactions are grouped into an experience set (referred to as a "moment" in FIG. 1). Experience set 106 has the experience name, in this example, "Night Out in Washington, D.C." In addition to a name, experience set 106 includes the names of its constituent transactions ("Ridesharing Co. A," "Eatery Co. A," and "Nightclub Co. A" in this example), the sum of those transaction amounts (or the "experience set amount") ($127.63 in this example), its time span (7:37-11:36 p.m. in this example), and its date (March 20 in this example). In some embodiments, GUI 100 may be displayed to a user for introductory purposes, such as before a user gets accustomed to using transaction management via experience sets after which a user may disable the display of GUI 100.

Figure 2:
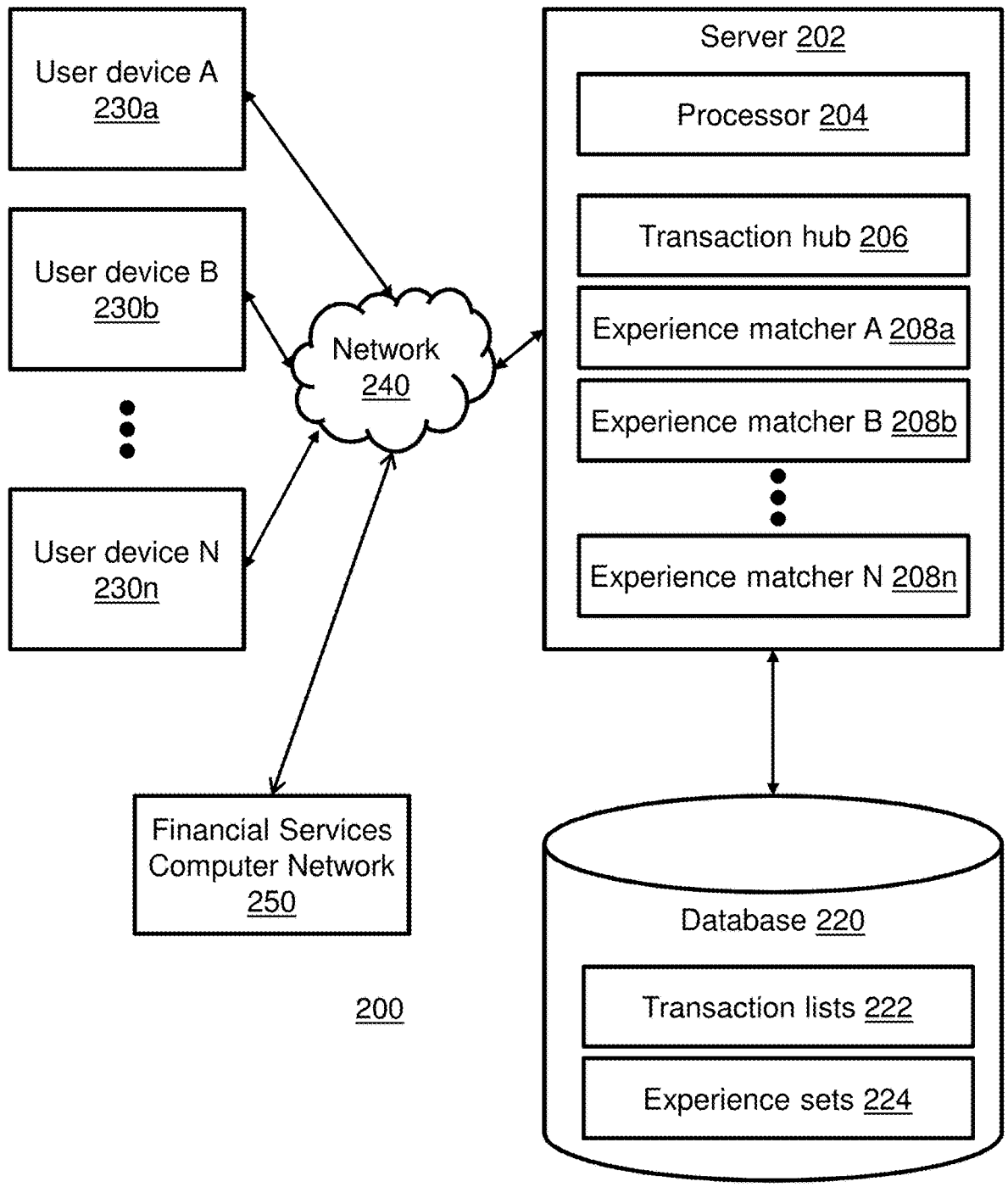
FIG. 2 is a diagram of an illustrative system for managing transactions from a financial services computer network, according to some embodiments of the present disclosure.

FIG. 2 shows a system for managing transactions from a financial services computer network, according to some embodiments of the present disclosure. "Financial services computer network" as used herein refers generally to one or more computer networks associated with any one or more financial service providers including banks, credit card providers, or other financial service providers where a user may have an account associated with payment transactions. The illustrative system 200 includes one or more user devices 230a, 230b . . . 230n (230 generally) coupled to server 202 via network 240. The system also allows communication with financial services computer network 250 via network 240. Server 202 may include processor 204, transaction hub 206, and one or more experience matchers 208a, 208b . . . 208n (208 generally). System 200 also includes database 220 coupled to server 202. Database 220 may include transaction lists 222 and experience sets 224. The various components of system 200 may be connected as shown in FIG. 2, or in any other suitable manner. The system components may be connected by one or more wireless or wireline computer networks.

User devices 230 may include smartphones, tablets, or other mobile devices configured to install and run user applications (apps). User devices 230 may also include laptop or desktop computers. User devices 230 may include one or more processors, hardware (e.g., touchscreen device) and software to receive input from and to display user interfaces to a user, and local storage. In some embodiments, user device 230 may run a money-management application that communicates with server 202 to retrieve experience sets identified within a list of transactions. In some embodiments, transaction hub 206 may include an application programming interface (API) via which user device 230 can issue various requests disclosed herein.

Transaction hub 206 may be configured to receive a transaction list from a financial services computer network, from a user device, or from a database (e.g., transaction lists 222). Transaction hub 206 may also be configured to receive transactions one by one, or in any other groupings, from financial services computer network 250. For example, in response to a user authorizing a transaction, financial services computer network 250 may send the transaction in real time to transaction hub 206. A "transaction list" as used herein includes lists that have at least one transaction (e.g., 1, 2, 3 . . . 10 . . . 20 . . . 100 . . . 200 . . . 1000). Once it has a transaction list, with one or more transactions either received at once or received at potentially varying times, transaction hub 206 may send a request to one or more experience matchers 208 to identify one or more experience sets within the transaction list. The experience sets to be identified by experience matchers 208 may be preliminary, especially when additional follow-on transactions building up the transaction list are later received. As such, the collection of experience sets identified within a transaction list may be dynamic; it may change and evolve as the transaction list changes or as parameters affecting the matching process are modified (e.g., by a user, based on personal preferences). Transaction hub 206 may be configured to receive one or more identified experience sets from the experience matchers, and to store the identified experience sets in database 220, for example in experience sets 224. Transaction hub 206 may further be configured to store the transaction list in transaction lists 222. Experience sets 224 and transaction lists 222 need not be structurally distinct tables; the sets and the transactions may be relationally identified through flags that indicate which transactions belong in which experience sets.

In some embodiments, transaction hub 206 sends the same transaction list to a plurality of experience matchers. After processing by the experience matchers, transaction hub 206 may receive one or more identified experience sets from one or more of the experience matchers. As an example, after sending a transaction list containing transactions 1 through 8, transaction hub may receive an identified experience set from experience matcher A 208a for transactions 4-6 and two additional identified experience sets from experience matcher B 208b for transactions 1-3 and 7-8. As such, the eight transactions would be grouped into three experience sets of two types. In some embodiments, transaction hub 206 may receive conflicting experience sets from the experience matchers. This can happen when two or more received experience sets share at least one transaction (e.g., different alternative groupings of transactions or different experience set assignments). For such cases, transaction hub 206 may be configured to resolve the conflicts, for instance by also receiving a match score from each of the experience matchers. Transaction hub 206 may also be configured to resolve conflicts by applying a predetermined hierarchy of priorities—for example, a "trip" may be chosen to be more meaningful than "lunch" if a transaction is matched as both a lunch and as a trip. The hierarchy may be determined by user research, user feedback, or machine learning. The scores can be used by the transaction hub to choose between different experiences set assignments, or to create an optimal grouping of transactions. In some embodiments, the transaction hub may group the transactions into sub-lists, and send to the experience matchers the sub-lists for identifying an experience set that is constrained to include all of the transactions in the sub-list.

Experience matchers 208 may each contain a processor and a memory. Experience matchers 208, in some embodiments, need not include a dedicated processor; instead, they may run on one or more separate processors, which may be individual or shared. Experience matchers 208, in various embodiments, run as distinct processes regardless of the type of processor used. This provides several benefits, including scalability (as more experience matchers are added, the transaction hub isn't directly impacted), asynchronicity (the experience matchers can work separately on different timescales without depending on each other or the transaction hub), and the ability to swap in or out experience matchers (e.g., if they crash, if their update is needed, for some other reason). In some embodiments, the experience matchers may rely on instructions stored in memory as well as a local database of transaction history to reference as new transactions come in. However, implementation may also include the ability to call out to the network to reference other sources of information, such as a machine learning model or a more detailed history of a user's behaviors and transactions, in order to better identify experience sets.

Experience matchers 208, in some embodiments, are configured to receive a list of transactions, identify one or more experience sets within the list, and return the one or more identified experience sets. Experience matchers 208 may be configured to receive the list of transactions either all at once, or to receive transactions one by one (e.g., individually or in groups, such as when a user makes them) and thereby process a transaction list that is adjusted as new transactions are received (e.g., in real time). In some embodiments, each experience matcher is configured to identify only one type of experience set. As such, new experience matchers may be added easily as they are identified through user feedback or machine learning. In some embodiments, the experience matchers are constrained to identify an experience set that would include all of the transactions within a received sub-list of transactions.

As one specific example of a basic implementation of an experience matcher, a "meals" experience matcher, which looks for meals, is provided as follows. This implementation can be augmented to utilize machine learning, user feedback, etc. For example, the time ranges referenced in the meals experience matcher can be adjusted based on machine learning to show what times of day the users tend to purchase meals. The meals experience matcher provided in this example is based on time, location, and previous transaction history. This experience matcher may keep a local data store of transaction history for a given user. When a given transaction is received by this meals experience matcher, the meals experience matcher may perform the following steps:

1. Checks that the transaction is within a set of allowed merchant category codes (MCCs). That set might include code 5812 (eating places, restaurants), code 5813 (drinking places), etc. If the transaction is not in the set, the experience matcher determines it's not part of a meal, at least within the scope of this step.
2. If the transaction is within the MCC set, the experience matcher then checks the time of day that the transaction occurred, and determines whether the transaction occurred within certain time intervals. For breakfast, the transaction may have to occur between around 6 a.m. to 10 a.m. For lunch, the transaction may have to occur between around 11 a.m. to 2 p.m. For dinner, the transaction may have to occur between around 5 p.m. to 8 p.m. If the transaction is not within an allowed time interval, the experience matcher may determine it is not part of a meal.
3. If the transaction is within the MCC set and within an allowed time interval, the experience matcher may determine that it is a meal experience set. But the experience matcher may also look in the local data store to see if there was another matching meal recently. If so, the transaction is appended to that previous meal experience set.
   a. For example: if transaction 1 comes in at 11:30 a.m. at Restaurant A, it may be classified as a lunch. The experience matcher reports back that transaction 1 belongs in a lunch experience set.
   b. If transaction 2 then comes in at 11:45 a.m. at Ice Cream Vendor B, it is a lunch and it is the same lunch as transaction 1. The experience matcher may report back that transaction 1 and 2 belong together in the same lunch experience set.
4. Then, regardless of whether a meal experience set was found or not, the transaction may be added to the local data store of transaction history for future reference.

As another specific example of a basic implementation of an experience matcher, a "human category" experience matcher, which condenses complex categories into a smaller set of simple categories and also groups based on time/location is provided as follows. The human category experience matcher aims to condense transaction categories from MCCs—which are merchant-facing, often inexplicable categories—to human-understandable categories, and it also aims to aggregate transactions that are closely related in time/location. This provided example is a "grocery shopping trip" where a user visits two grocery stores to get all of his/her items. The experience matcher may keep a local data store of transaction history for any given user. When any given transaction comes into the Human Category experience matcher, it may perform the following steps:

1. The experience matcher may contain a mapping table (in memory or in a database) which maps all possible MCCs (of which there may be hundreds or more) to a predetermined list of human categories (of which there may be approximately ten or so in this example). The experience matcher may map the transaction to the human category, and may call the resulting set a human category experience set.
2. The experience matcher then may check the local data store to see if any other transactions belonging to that human category occurred within the last hour or two (this is configurable). If so, the experience matcher may determine that the new transaction belongs to the same human category experience set from before.
   a. Example: transaction 1 comes in at 2 p.m. at Food Retail Co. A (code 5411—"grocery stores, supermarkets"). The experience matcher determines this is a "groceries" category ("groceries" is one of ten or so human categories in this example) and reports this back to the transaction hub.
   b. Transaction 2 comes in at 2:45 p.m. at Food Retail Co. B (also code 5411). The experience matcher may determine that this is a "groceries" category, and also may see that there was a previous groceries experience set from earlier. The experience matcher may report back that transaction 1 and transaction 2 both belong in the same "groceries" experience set.

The parameters defining the exemplified meals experience matcher and human category experience matcher, such as the MCC sets and the time ranges, may be modified. Similar parameters for experience matchers other than the two particular ones detailed here may also be modified, for example as re-calibrated default values, as updated suggested values, or as values chosen by users. Other than parameters for identifying an experience set, other parameters affecting the list of transactions may also result in changes to the identified experience sets. For example, while a chosen time range of 6 a.m. to 10 a.m. may directly affect identification of a breakfast experience set, an effective time-restriction preventing some experience sets from spanning more than a certain number of days (e.g., 1, 2, 3, 7, 30), such as through sending a list of transactions only for one full day to the experience matchers, might also indirectly affect the identified experience sets. New experience matchers may be added, other ones may be deleted, some may be merged, and some may be split into more specific experience matchers, for example based on user research or machine learning. Many of these modifications may be carried out with ease, in part because the experience matchers are independent from each other.

Experience sets may include an experience set name, an experience set date (or date range), an experience set time span, and an experience set amount (corresponding to the total monetary expenditure of the constituent transactions). Experience set names may include "lunch," "night out," "trip," and many others, and may also include names chosen by a user. In some embodiments, the constituent transactions of an experience set temporo spatially relate to each other, in other words they occur in physical proximity (e.g., 1 mile, 2 miles, 3 miles, 4 miles, 5 miles, 6 miles, 7 miles, 8 miles, 9 miles, 10 miles) to each other within a certain time range (e.g., 1 hr, 2 hrs, 3 hrs, 4 hrs, 5 hrs, 6 hrs, 7 hrs). Each transaction may have a transaction name, a transaction time, a transaction place, and a transaction amount.

Experience sets may be created, in some embodiments, by using various transaction attributes, such as location and time. The sets may also be created by relying on correlations between various transactions, as obtained from analysis of one or more users' transaction histories. In some embodiments, the experience sets are created using clustering algorithms (e.g., k-means, UPGMA, DBSCAN, or any other known algorithm). The dimensionality of the transaction attributes for clustering may be two (e.g., time and location) or it may be higher than two (e.g., time, location, and cross-correlation value). For some embodiments, processing of transaction data includes making use of information related to the authorization request. This enables, for example, using the time that a merchant or point of sale has requested authorization for transaction, which confers real-time capabilities for recognizing a particular time a transaction has occurred so as to distinguish between lunch and breakfast, etc. Usage of authorization time as opposed to the usual settlement time improves over pre-existing methods of handling transaction lists. In addition, the transaction data may be processed to obtain the particular location that a transaction has occurred, which also helps with improving accuracy of grouping transactions into experience sets. In some embodiments, the financial services computer network 250 may obtain the authorization time on the backend using a third party payment processor (not shown here). In contrast, conventional financial service providers may not be able to obtain the authorization time which results in inaccurate grouping of transactions into experience sets. Processing the transaction data to gain insights on the location of merchants is further described in U.S. patent application Ser. No. 14/162,850, filed on Jan. 24, 2014, which is hereby incorporated by reference in its entirety.

Database 220 may include non-volatile memory configured to store data for transaction lists and experience sets. In some embodiments, database 220 may include a relational database having one or more tables to store users, transaction lists, and experience sets. Transaction lists 222 and experience sets 224 may each have various associated attributes, such as user, name, date, time, place, and amount. Some of the attributes may be singular values (e.g., $10), while some may be arrays or matrices (e.g., two coordinate values for location, or multiple values for the constituent transactions). The tables may reference each other, instead of replicating data. As such, database 220 may contain the information for transactions and experience sets in a common table, rather than in separate transactions lists 222 and experience sets 224.

Figure 3:
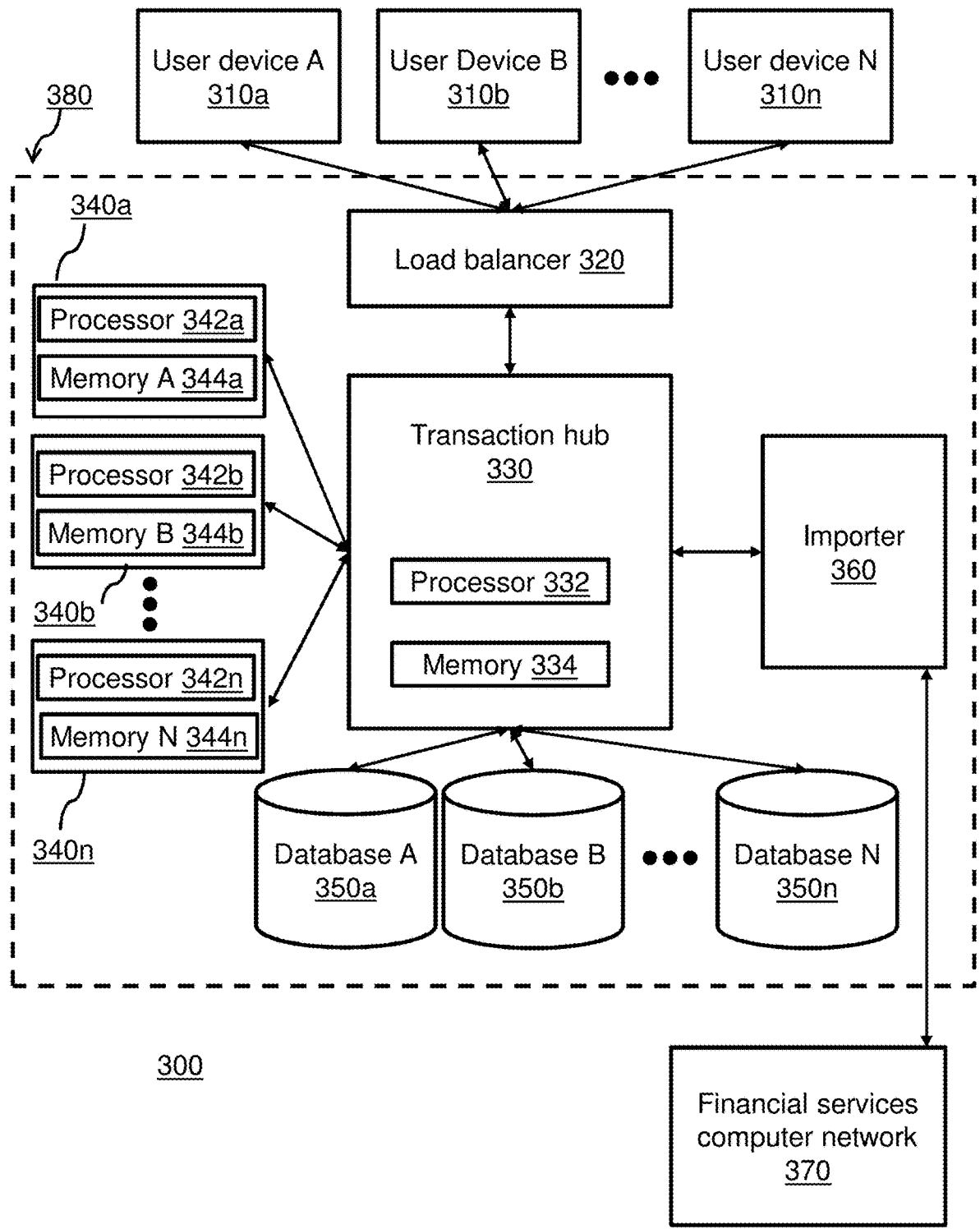
FIG. 3 is a diagram of an illustrative system for managing transactions from a financial services computer network, according to some embodiments of the present disclosure.

As shown in FIG. 3, the server and the database may form part of server architecture 380. The server architecture may include transaction hub 330 coupled to importer 360 for receiving transactions from financial services computer network 370, and may include load balancer 320, coupled to transaction hub 330, for communicating with user devices 310. The transaction hub may further be coupled to databases 350 and to experience matchers 340.

Transaction hub 330 may receive transactions in real time from importer 360, and may send them over to the experience matchers 340 to discover experience sets, and then may store the transactions and experience sets in databases 350 and make them available as an API for user devices 310 to fetch experience sets to display to users. In a sense, transaction hub 330 acts as a coordinator. Transaction hub 330 may also standardize the formats of different transaction types (e.g. bank transactions and credit card transactions) as they may have different data formats as compared to those of different financial services computer networks 370.

Importer 360 is a tool that may import transactions in real time from financial services computer network(s) 370. The implementation details can be varied, for example it could be scheduled to call an API or a live streaming data platform. There may be different variants of the importer to talk to different financial services computer networks (e.g., a "credit card transaction importer" that can receive credit card transactions, vs. a "bank transaction importer" that can receive bank transactions). For credit card transactions, importer 360 may also serve the role of reconciling initial card "authorizations" (which provide a precise timestamp such as "Jul. 2, 2018, 10:23 AM"—but are not official charges to a customer yet) with the subsequent transaction "posts" (which are officially charged to a customer, but only provide a date with day-precision such as e.g. "Jul. 2, 2018"), to ensure that accurate timestamp data is available on transactions possible for the experience matchers to utilize.

Experience matchers 340 may receive transactions from the transaction hub in real time (as they are relayed to the transaction hub), perform discrete domain-specific logic to identify experience sets (each matcher knows how to look for one or more specific experience set types), and report the experience sets back to transaction hub 330 for storage in databases 350. In some embodiments, each experience matcher 340 includes its processor 342 and its memory 344. In some embodiments, processors can be external to the experience matchers and can be shared or pooled among experience matchers. In some embodiments, transaction hub 330 includes processor 332 and memory 334. In some embodiments, processor 332 may be external to transaction hub 330, and may be a shared processor.

Load balancer 320 is a tool that can be used in large scale computing. It helps to distribute requests from large numbers of user devices 310 to multiple running instances of transaction hub 330 (and experience matchers 340, importer 360, etc.) to optimize resources, maximize throughput, and minimize response time.

Databases 350 may store both transaction history and experience set information (including metadata about the experience sets) for reference and access by transaction hub 330. A user device 310 may be a computer, smartphone, tablet, web browser, etc.

Using multiple databases may allow for scaling the architecture. Using multiple experience matchers may allow for scaling per host (e.g., through multiprocessors or multi-threads) and scaling across hosts (e.g., for clustering/distributed processing). Using multiple separate experience matchers may also allow for easily scaling the number and type of experience sets that can be processed. For example, if feedback from an individual user requests dividing a single experience set type (e.g., "night out") into more granular experience set types (e.g., "Friday night out," "Saturday night out," and "Sun-Thu night out"), such a change in the experience set numbers and types can be accommodated within the scalable architecture. In some embodiments, different users may use different experience set types, and such preferences may either be received from a user device or stored in database 350. Similarly, new experience set types can be added by incorporating new experience matchers into the server architecture.

In an implementation, experience matchers may be added manually. However, they can also be added or adjusted automatically. Machine learning models (e.g., by continuous learning or reinforcement learning or retraining) can be utilized to update an experience matcher in real time. It is also possible to design a generic experience matcher whose main logic is to "consult the machine learning model for [xyz] trend" and as the machine learning model discovers new trends, to dynamically spin up a new instance of this generic experience matcher tuned to look for that specific trend. Some implementations of the experience matchers may use hardcoded logic (e.g. the meal time ranges), but these may also be designed to be adjustable based on user experience research or user feedback. For example, if users report that they often have lunch at 10:30 a.m., the experience matcher could be adjusted (e.g., in real time) to account for this. Machine learning might also show that users start eating lunch around 10:30 a.m. and adjust the experience matchers accordingly.

Figure 4:
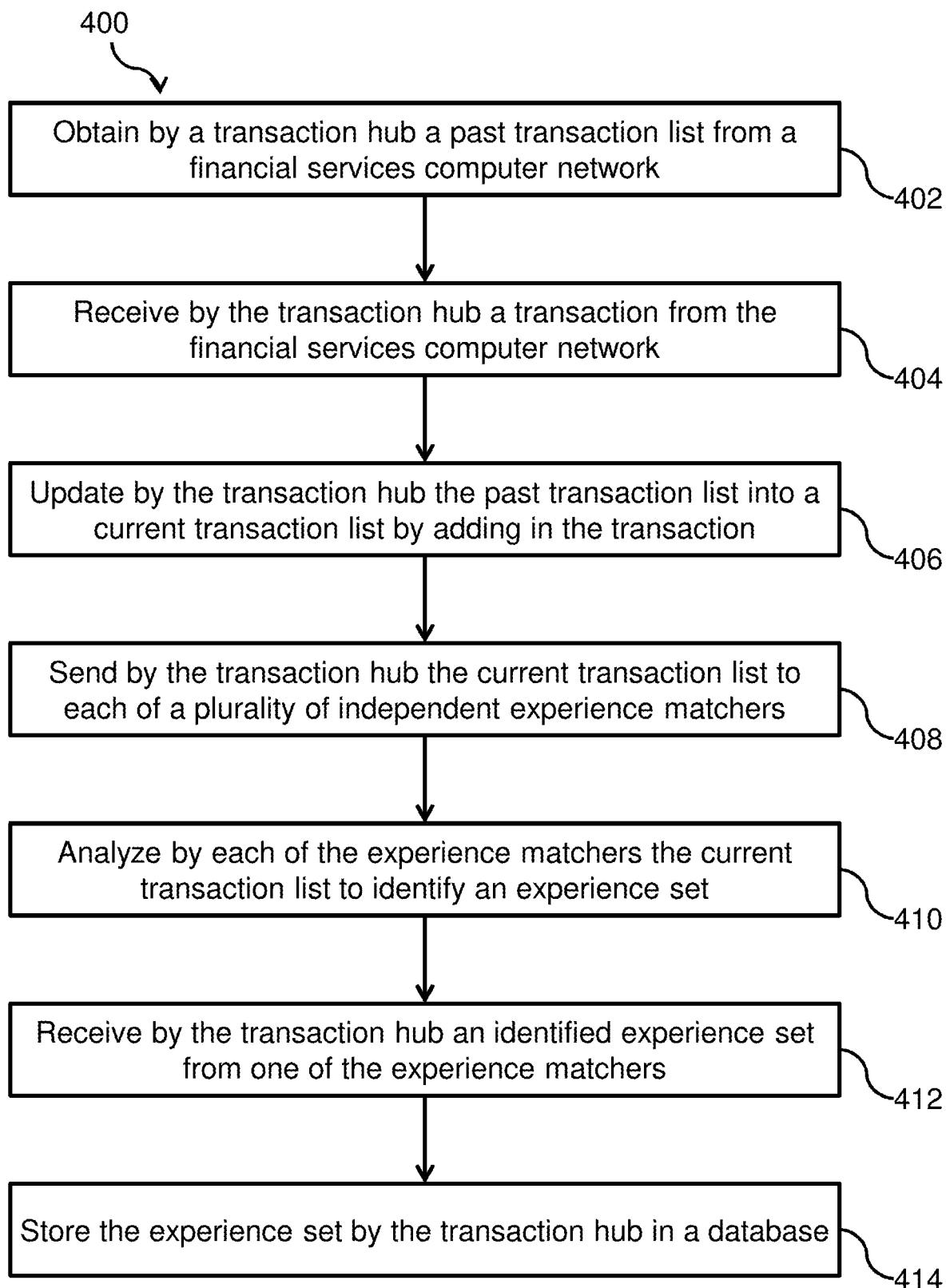
FIGS. 4 and 5 are flow diagrams showing processing that may occur within a system for managing transactions from a financial services computer network, according to some embodiments of the present disclosure.

FIG. 4 shows method 400 for forming an experience set from a transaction list received from a financial services computer network, according to some embodiments of the present disclosure. Method 400 may be implemented within a server, such as server 202 shown in FIG. 2. At block 402, a transaction hub may obtain a past transaction list from a financial services computer network. In some embodiments, the transaction hub may obtain the past transaction list from a database or a user device. Once the transaction hub updates the past transaction list into a current transaction list (block 406) upon receiving a new transaction (block 404), it may send the current transaction list to multiple experience matchers (block 408). This, in some embodiments, reflects the ability of the system to process transactions in real time, for example by sending an updated transaction list after receipt of each new transaction. In some embodiments, transaction hub may send a past or current transaction list to the experience matchers at certain times (e.g., 10 p.m. each day) or with certain periods (e.g., every 2 hours) or after certain events (e.g., receipt of an update, such as a new transaction). At block 410, each of the multiple experience matchers analyzes the current transaction list to identify an experience set. In some embodiments, each experience matcher is configured to search for only one type of experience set, although there may be more than one experience matcher that searches for the same type of set to attain scalability. After an experience matcher identifies an experience set within the transaction list, the transaction hub may receive that identified set (e.g., the information for the experience set, such as its constituent transactions) at block 412, and then store it at block 414 in a database. The information that the transaction hub receives from the experience matcher may include the name, date(s), and time range for the experience set. In some embodiments, the name, date(s), and time range of the identified experience set may also be generated by the transaction hub, without needing to receive those from an experience matcher. In some embodiments, the transaction hub pre-processes a transaction list (current or past) into sub-lists, and then sends one or more of the sub-lists to the multiple experience matchers so that they can find an experience set that contains all of the transactions in the sub-list. In some embodiments, the transaction hub may send to the experience matchers a longer transaction list that may contain more than one experience set.

Figure 5:
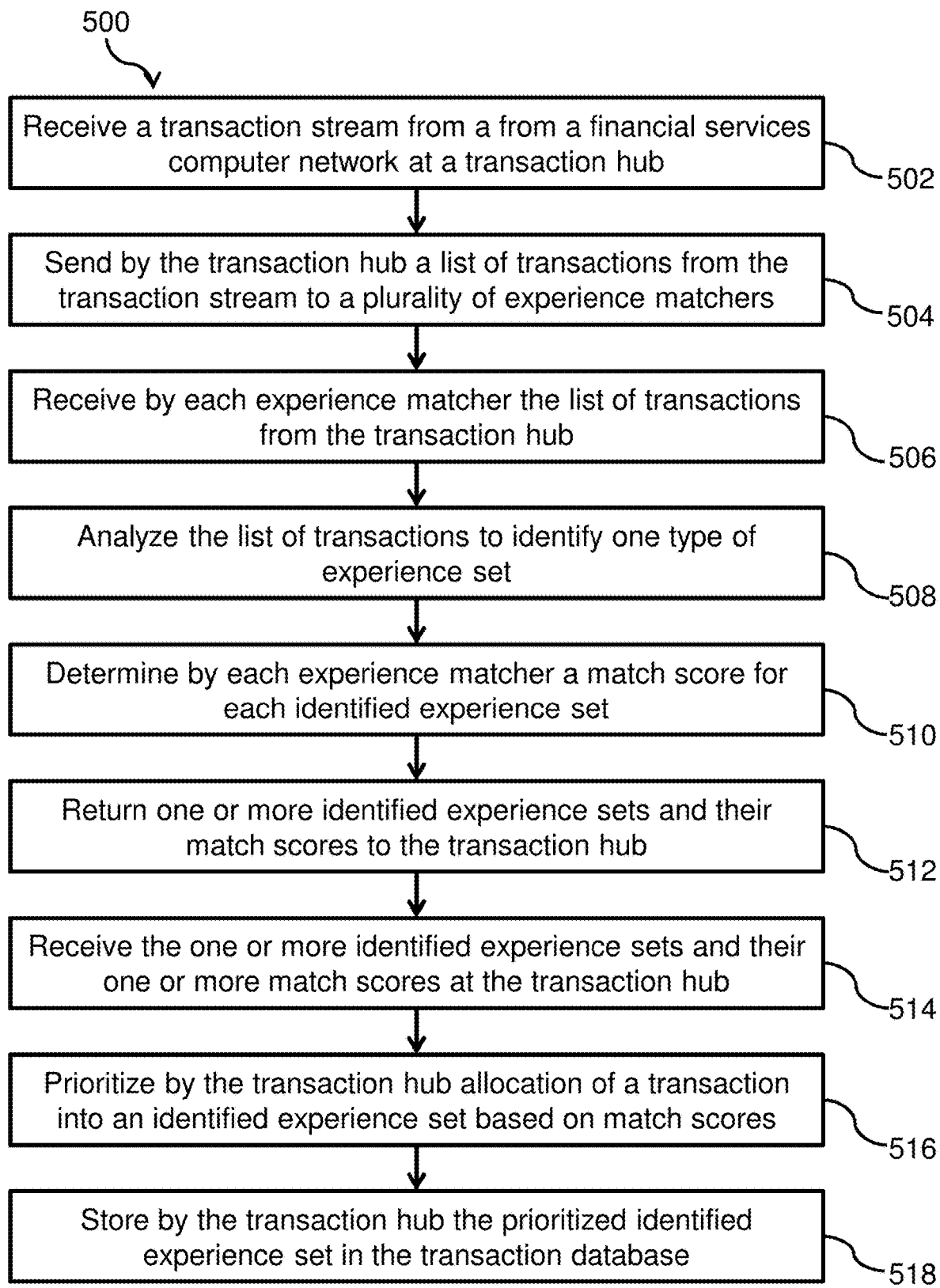

FIG. 5 shows method 500, implemented within a scalable system architecture, for generating a humanized experience set from a list of transactions, according to some embodiments of the present disclosure. Method 500 may be implemented within a server architecture such as server architecture 380 shown in FIG. 3. At block 502, a transaction hub of the server may receive a transaction stream from a financial services computer network, and then send a list of transactions from the stream, at block 504, to multiple experience matchers of the server. The transaction stream refers to an updated collection of transactions received from a source such as a financial services computer network, which may be updated continually or periodically or on an event basis. For example, for a given exemplary start date (which can be changed) of the beginning of the month, the transaction stream includes the continually growing list of transactions since the beginning of the month up until the time that processing within the system occurs. The list of transactions that can be obtained from this transaction stream may contain all of the transactions of the transaction stream in some embodiments; however, once obtained from the transaction stream for processing (e.g., for analyzing to identify an experience set within), a given transaction list has a limited number of transactions, even though a new updated list of transactions may then be generated from the transaction stream for further processing (e.g., by sending a new list of transactions to the experience matchers, sending one or more new transactions to be appended to the list of transactions to create a new list of transactions). In some embodiments, the list of transactions contains fewer transactions than the transaction stream (e.g., the transactions for a given day). The list of transactions may be obtained from the transaction stream through a variety of ways, for example by taking the last predetermined number of transactions (e.g., 10, 20, 30, 40, 50, 60, 70) or transactions for a recent time span (e.g., the last 24 hours, the last calendar day, the last 12 hours, the last 6 hours). Once each experience matcher receives the list of transactions at block 506, it may analyze the transaction list to identify its type of experience set within it at block 508, and determine a match score for any identified experience sets at block 510. After a return of one or more identified experience sets by the experience matchers at block 512 and their receipt at the transaction hub at block 514, the transaction hub may run a prioritization routine at block 516 to obtain an optimal (e.g., based on user feedback or preference or past experiences) grouping of transactions into experience sets, and then store at block 518 the found experience sets in a database.

In some implementations having a small set of experience set types, the prioritization may be hard-coded based on the general premise that "special is better than ordinary". For example, a user may have multiple meals every day; so, the user will see "meal" experience sets frequently. If the user is on a trip across the country, the user will also be eating meals—but, the trip is far less frequent (more special) than meals, so the prioritization may favor the trip over meals. The least prioritized experience set type, in some embodiments, may be the human category (effectively, in these embodiments, a fallback to ensure every transaction has some sort of human-understandable meaning), and nights-out and trips, in some embodiments, are the most prioritized experience set types. Without being limited to such hierarchical schemes, prioritization may also be based on user feedback and machine learning. The transaction hub may retain information about matching experience sets for a transaction; so, if the user provides feedback that he/she prefers a different prioritized experience set (e.g., by manually editing the experience set), the system could incorporate this feedback and provide personalized prioritization on a per-user basis. The system could also observe large scale trends in edited experience sets to tweak the overall prioritization scheme over time. When new experience set types are added, they could be added with an initial relevance indicator (e.g., something like "special" or "medium" or "ordinary") to provide some initial prioritization, but that prioritization could be adjusted by the system over time in response to user feedback or machine learning.

In some embodiments, the present disclosure provides systems and methods for improved visualization of transaction lists, as further explained below.

Figure 6:
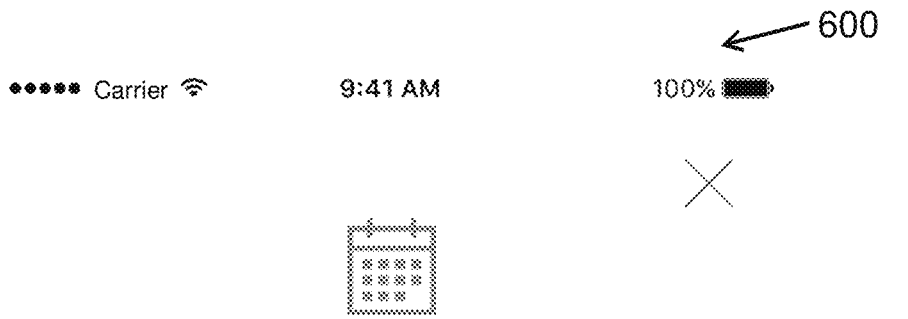
FIG. 6 illustrates a GUI having a calendar with graphical elements indicative of total amounts spent for the experience sets in a corresponding day, according to some embodiments of the present disclosure.
Figure 6:
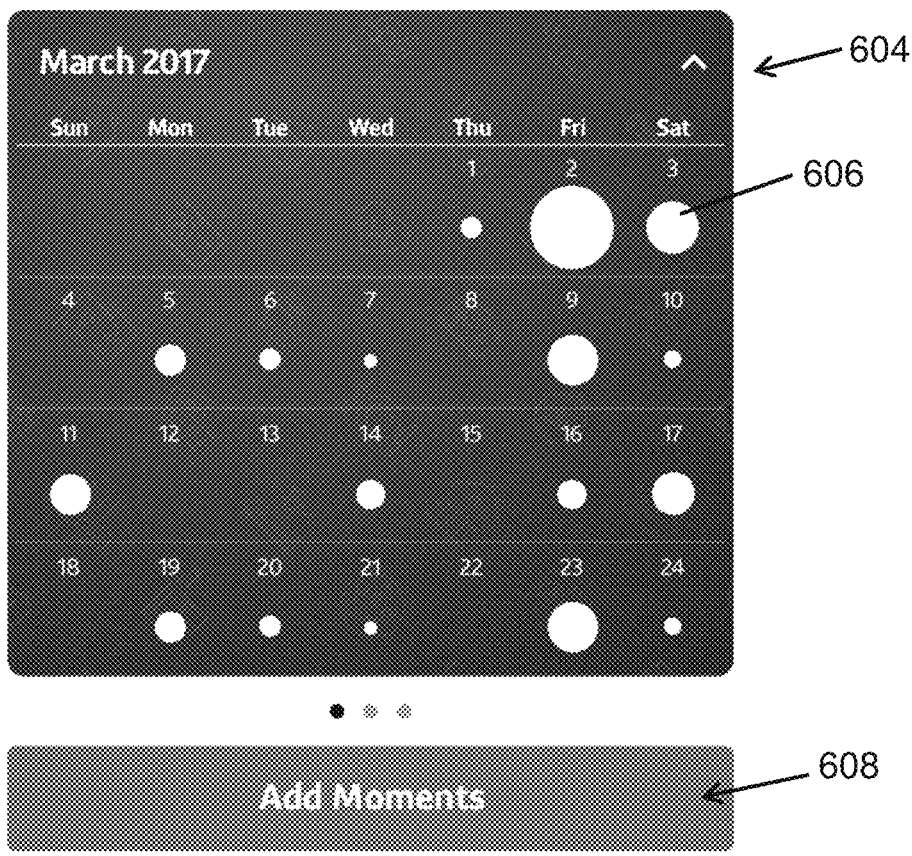

FIG. 6 illustrates GUI 600 that has a calendar view associated with experience sets, according to some embodiments of the present disclosure. As shown, GUI 600 includes an explanatory message 602, which may be disabled by a user, and calendar 604. On the calendar, graphical element 606 indicates the relative total dollar amount of all experience sets in the day under which it is placed. In the shown embodiment, the graphical element is a disk, and has an area proportional to the total experience set amount in that day. Also shown is control 608, which allows a user to request display of experience sets covered by the days shown in the calendar. One way in which GUI 600 may improve over existing interfaces lies in its use of authorization times, which may be obtained from a financial services computer network via an importer, and which allow for improved and accurate insights into the spending patterns of a user. The use of precise authorization times, as opposed to the standard settlement times, enables a user to intuitively visualize their transactions in the unique calendar view and gain an understanding of spending relationships that are not available in existing interfaces (e.g., experience set types for which a user spends most; experience set types and how they vary with days of the week, or with other patterns of time).

Figure 7:
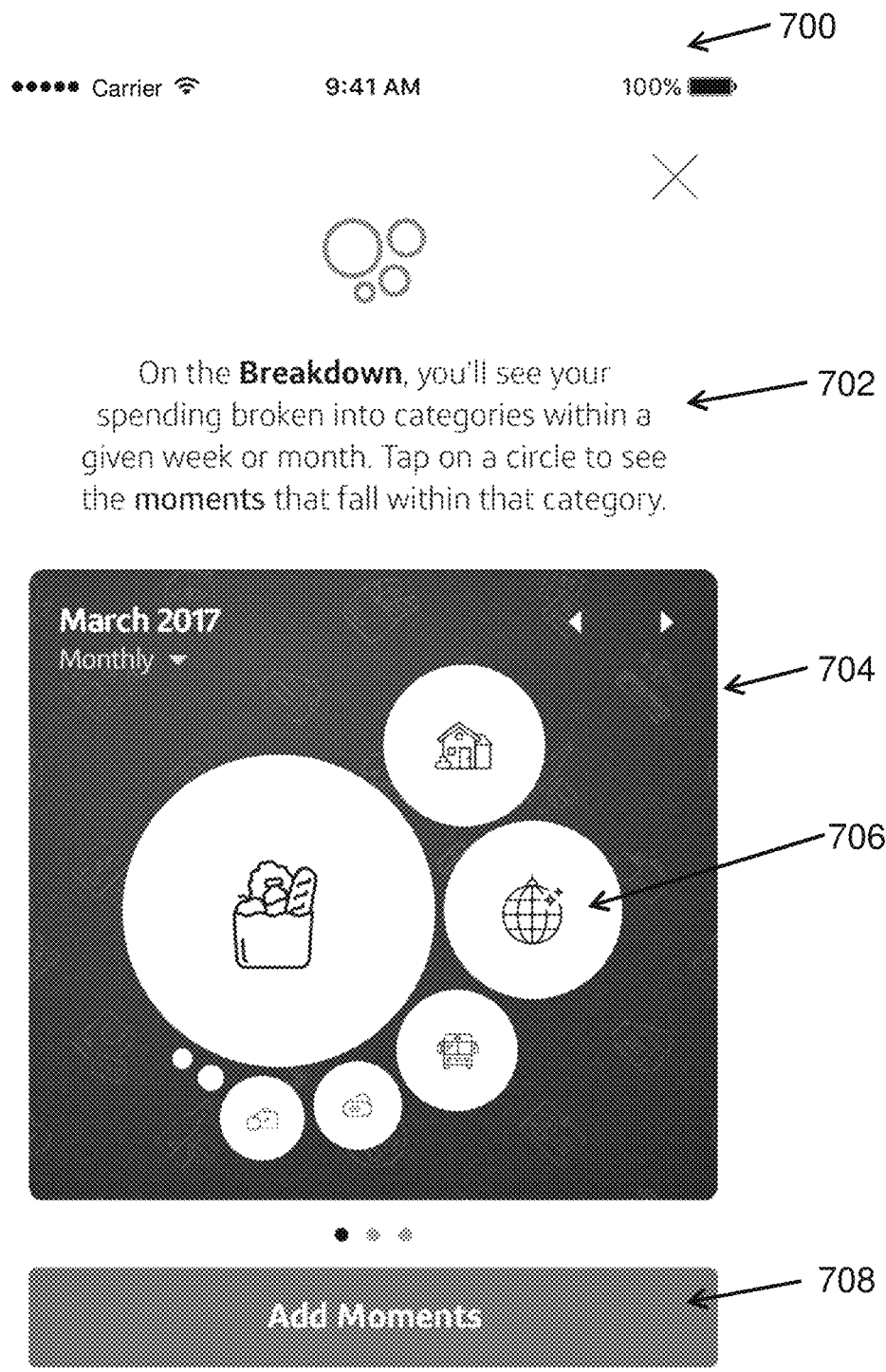
FIG. 7 illustrates a GUI having a breakdown schematic with graphical elements indicative of the experience category amounts in a time period, according to some embodiments of the present disclosure.

FIG. 7 illustrates another example of improved visualization of transaction lists, showing GUI 700 that has a breakdown schematic associated with experience set categories, according to some embodiments of the present disclosure. As shown, GUI 700 includes explanatory message 702, which a user may disable, and breakdown schematic 704. The breakdown schematic contains graphical elements 706 each of which indicates a distinct experience set type and total dollar amount for that experience set type. An experience set type (alternatively, experience set category) is a collection of one or more experience sets each of which has the same type. In some embodiments, it is possible for an experience set type to overlap with or resemble a traditional MCC; however, an experience set type comprises one or more experience sets that reflect a user's experiences rather than being solely or primarily based on individual transactions sharing a merchant-based code or related codes. In some embodiments, GUI 700 allows displaying traditional MCC-based groupings of transactions as well. In some embodiments, users may create their own categories for the experience sets, which can be visualized in GUI 700. Control 708 allows a user to request display of a breakdown of the experience set types covered by the breakdown schematic. In some embodiments, the breakdown schematic is limited to experience sets within a time period (e.g., one week, one month). In some embodiments, an experience set type is a higher order summary of the experience sets. For example, experience set "night out at location X" and "night out at location Y" may both belong to the same experience set type "night out." In contrast to existing interfaces, GUI 700 allows a user to visualize expense categories that are meaningful to a customer, rather than to a merchant. This is, in part, due to the grouping of transactions with precise authorization data (e.g., time, place) by the independent experience matchers into meaningful experience sets, which are further collectively displayed as experience set types in breakdown schematic 704.

In some embodiments, the system may not directly show MCCs to users, because MCCs are merchant-facing and often not as meaningful for users. Therefore, categories are at least conceptually distinct from MCCs, even if they sometimes may appear similar in practice. Instead of MCCs, the systems and methods disclosed herein may use "human categories." As mentioned earlier, in some embodiments there is an experience matcher that maps MCCs to human categories, of which there are around 10 in some embodiments, and which are human-meaningful (categories such as "shopping" or "food"). Some of the human categories may be reminiscent of MCCs—for example, "groceries" is a human category and also MCC 5411 ("grocery stores, supermarkets"). However, other human categories may be more general and may capture multiple MCCs (e.g. "food" is a human category that has many MCCs, like 5812 "eating places, restaurants" and 5814 "fast food restaurants").

Figure 8:
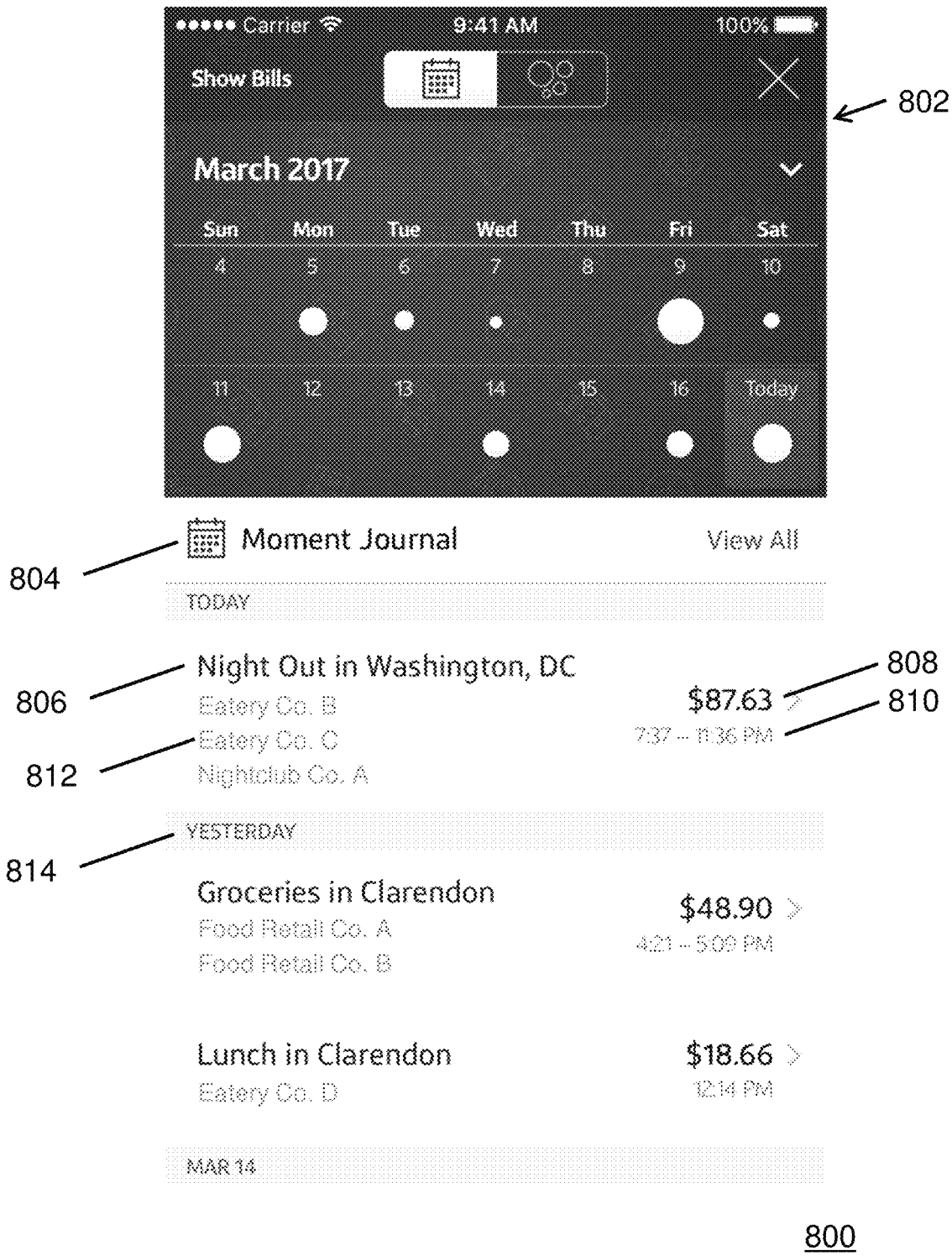
FIG. 8 illustrates a GUI having both a scrollable list and a calendar, according to some embodiments of the present disclosure.

FIG. 8 illustrates GUI 800, which has calendar 802 and scrollable list 804 (titled as "Moment Journal" for the end user in this embodiment), according to some embodiments of the present disclosure. Scrollable list 804 includes a listing of dates, such as the shown date 814, and a listing of experience sets. As exemplified by the shown topmost experience set, an experience set may have experience set name 806, experience set amount 808, experience set time span 810, and one or more constituent transactions 812. In some embodiments, a user can choose a date range, according to which the calendar and the scrollable list would be updated to contain experience sets within the chosen date range. For the days in the calendar in which expenses have been incurred, a graphical element (such as graphical element 606 shown in FIG. 6) may be shown in the calendar. The graphical element may be indicative of the total amount spent on that day (e.g., via proportional sizing). In some embodiments, as a user chooses (e.g., clicks on, taps on) a date on the calendar, the scrollable list is updated so as to show the experience sets of that day at the top. Similarly, in some embodiments, as a user chooses a date on the scrollable list, the graphical element for that day is differentiated (e.g., highlighted, enlarged, encircled, recolored, flashed) on the calendar. In some embodiments, the scrollable list by default shows only the top few (e.g., two, three) constituent transactions for each experience set. In contrast to the existing interfaces, GUI 800 enables a user to interactively visualize how a particular experience set fits into his/her overall spending pattern.

In some embodiments, a user may activate (e.g., click on, tap on) an experience set to see more details, such as a full list of its constituent transactions. In some embodiments, the GUI may have a territorial map of the experience set, as shown in the figure described next.

Figure 9:
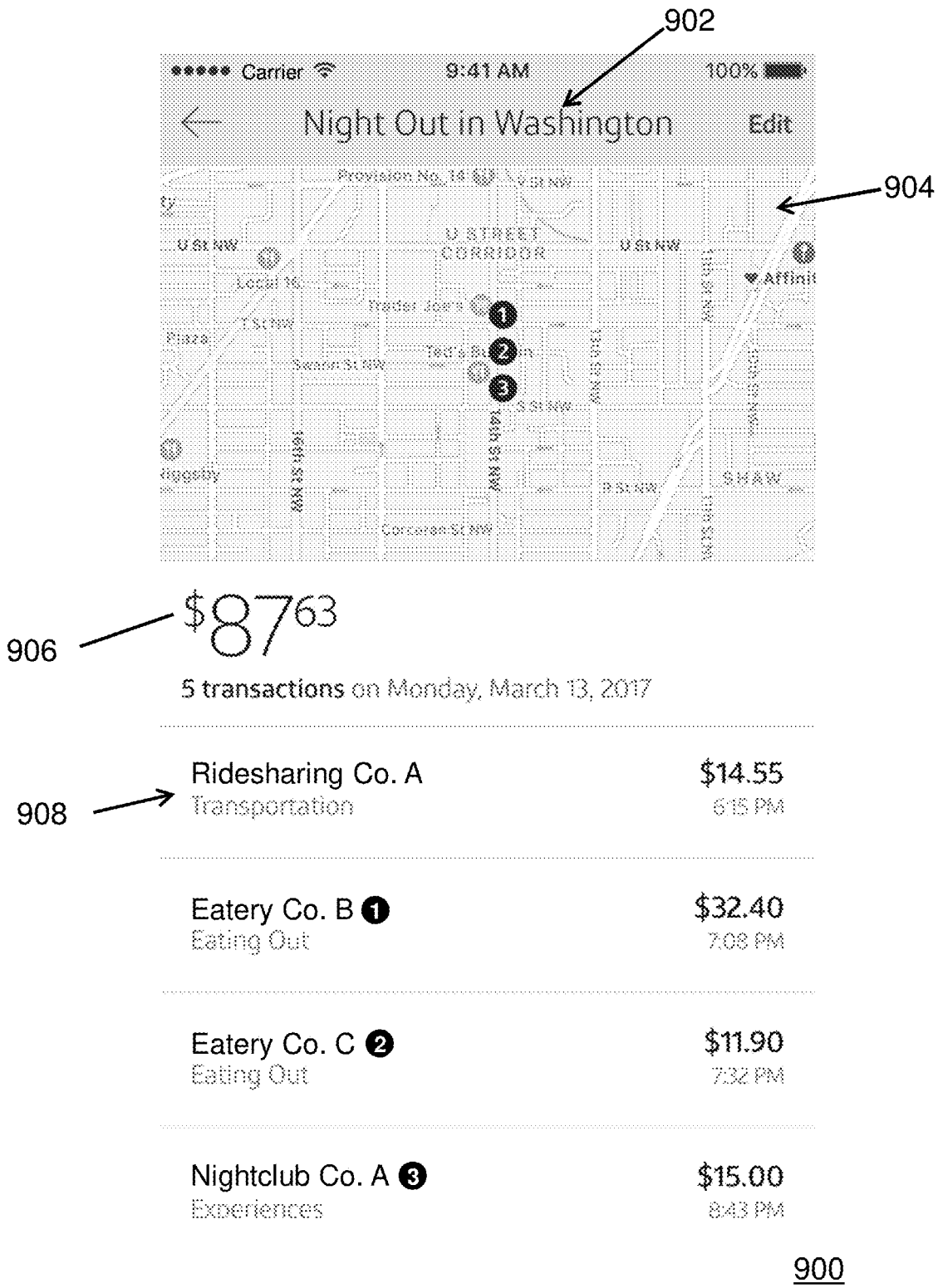
FIG. 9 illustrates a GUI having a territorial map with transactions of an experience set, according to some embodiments of the present disclosure.

FIG. 9 shows GUI 900, according to some embodiments of the present disclosure.

GUI 900 includes territorial map 904 and experience set name 902 for which the map is displayed. Under the map, in this embodiment, shown are experience set amount 906 and constituent transactions such as transaction 908. In contrast to existing interfaces, GUI 900 allows users to visualize the spatial attributes of their experiences distinctly from their other experiences.

In some embodiments, in addition to or apart from viewing a calendar, a user may view a breakdown schematic to visualize a transaction list, as shown in the figure described next.

Figure 10:
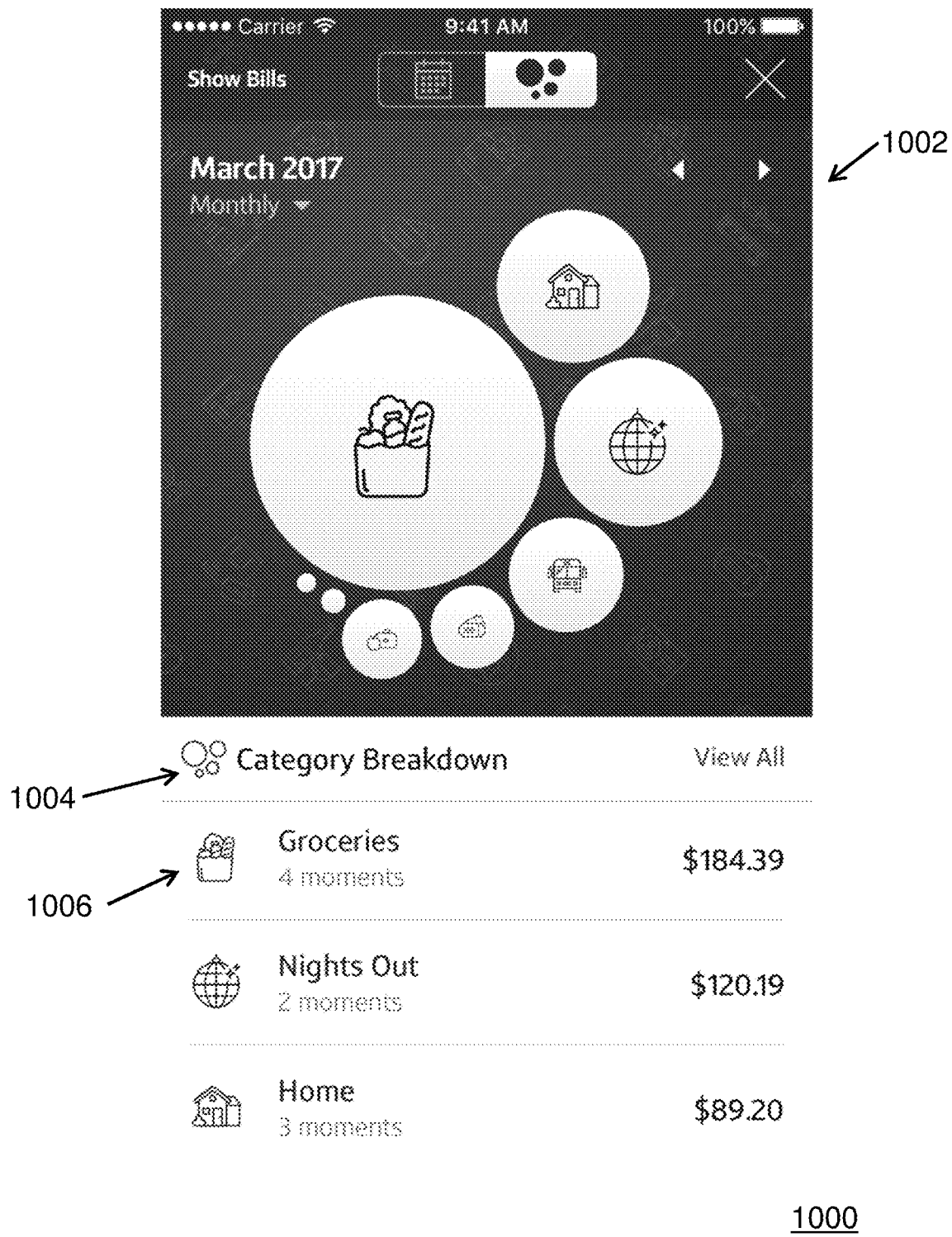
FIG. 10 illustrates a GUI having both a scrollable list and a breakdown schematic, according to some embodiments of the present disclosure.

FIG. 10 shows GUI 1000, according to some embodiments of the present disclosure. GUI 1000 includes breakdown schematic 1002, category listing name 1004, and experience set categories such as experience set category 1006. In some embodiments, breakdown schematic includes graphical elements that correspond to experience set categories, and which may also be indicative of the total amounts spent in those categories (as shown in FIG. 7). In some embodiments, there is a default date window (e.g., current month) that may be changed to any other date window by a user. The displayed breakdown schematic and category listing may be updated to contain the experience sets within the date window and exclude experience sets outside of the date window. In some embodiments, a user may activate an experience set category by clicking on it, tapping on it, etc. and visualize the constituent experience sets within the category. One example of that is shown in the next described figure.

Figure 11:
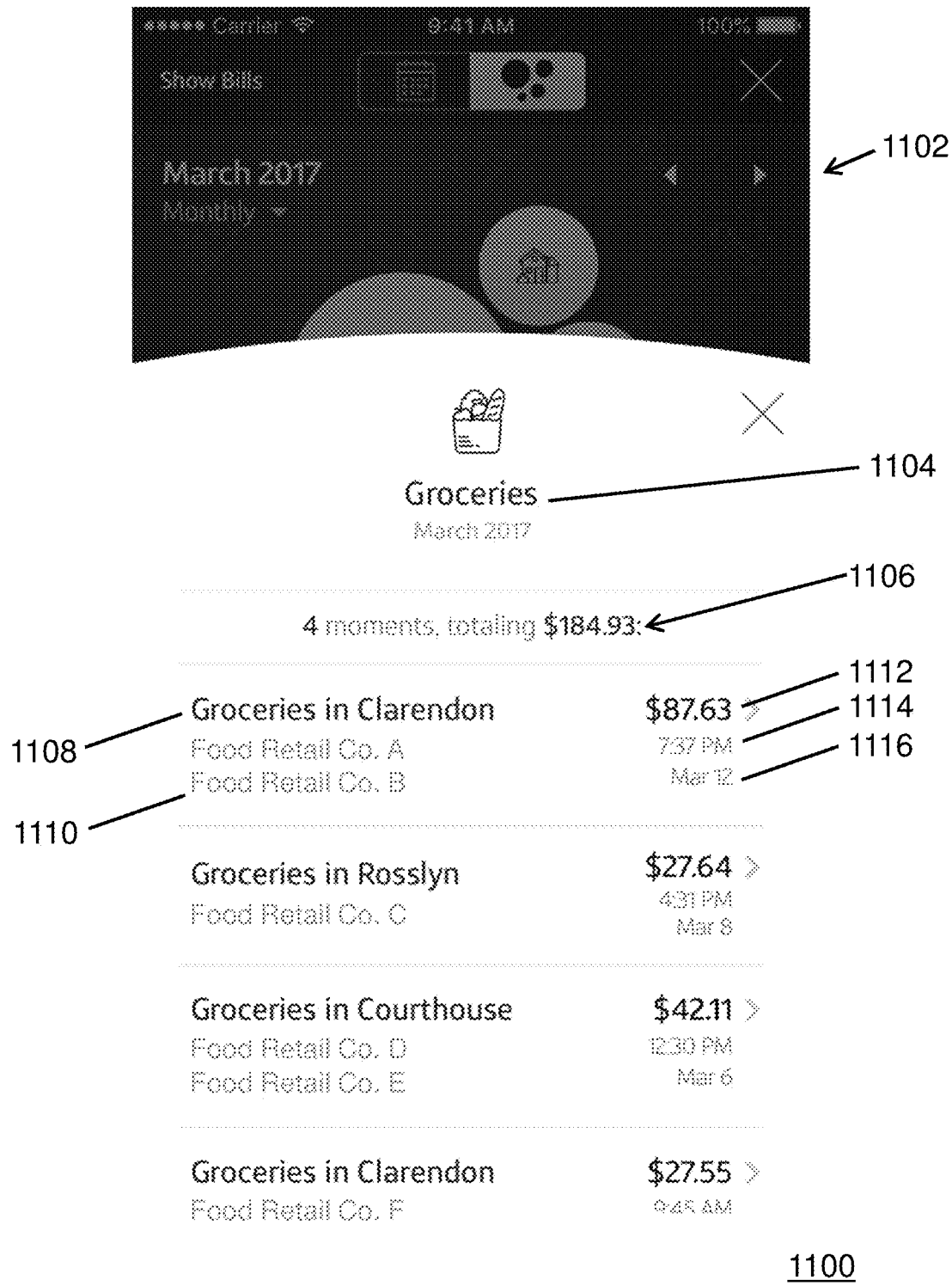
FIG. 11 illustrates a GUI having the experience sets within a chosen experience category for a given time period, according to some embodiments of the present disclosure.

FIG. 11 shows GUI 1100, according to some embodiments of the present disclosure. GUI 1100 includes part of breakdown schematic 1102, experience set category name 1104, experience set category total 1106, and constituent experience sets, such as the topmost shown experience set with experience set name 1108, experience set amount 1112, experience set date 1116, experience set time (e.g., start time, end time, time span) 1114, and the constituent transactions such as transaction 1110. In contrast to existing interfaces, GUI 1100 enables users to visualize their experience set types, which of such experience set types they spend the most on, and what particular transactions each experience set has in a given time frame. The processing of individual transactions by the multiple independent experience matchers, coordinated by the transaction hub, enables creation of experience sets, which further allows collections of experience set types, for example by the transaction hub or even by a user device, to be generated and displayed for providing insights to a user.

In some embodiments, for example those including a calendar, breakdown schematic, scrollable list, category listing, or any combination of these, a user may include or exclude non-discretionary (e.g., recurring) transactions in each of the visualizations. Non-discretionary transactions are those that reflect the expenses that a user would not normally be able to reduce or otherwise change. For example, in some embodiments, rent payments are classified as non-discretionary, since while a user may theoretically relocate or not pay rent, under normal circumstances the user is expected to pay a pre-agreed amount of rent. Similarly, utility bills, gym membership fees, etc. can be classified as non-discretionary. What is classified as non-discretionary may be customized by a user. An example of excluding non-discretionary expenses is shown in the figure described next.

Figure 12:
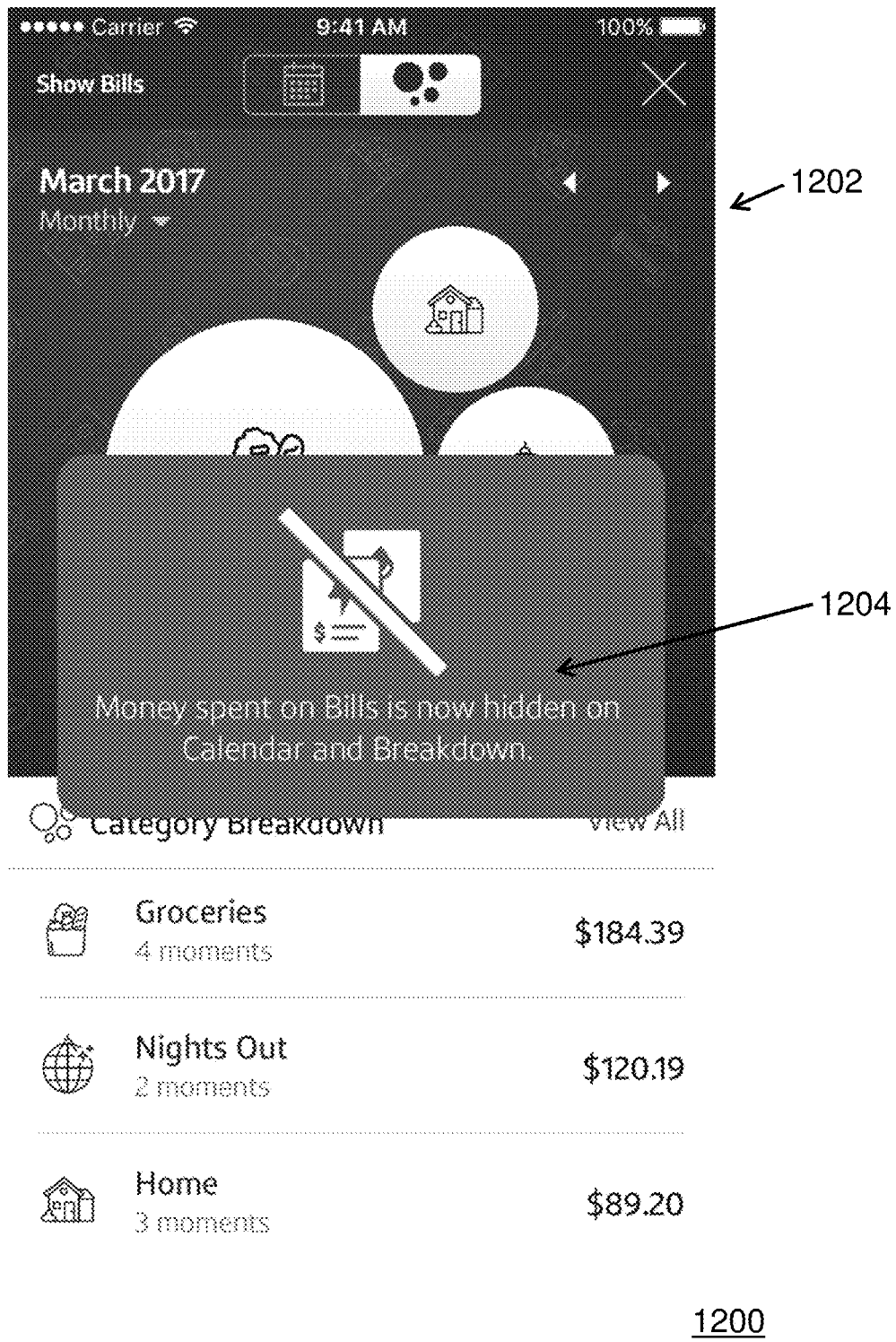
FIG. 12 illustrates a GUI having the exclusion of each predefined recurring transaction (which is a type of non-discretionary transaction) from each experience category and breakdown schematic, according to some embodiments of the present disclosure.

FIG. 12 illustrates GUI 1200, according to some embodiments of the present disclosure. GUI 1200 includes breakdown schematic 1202 and message 1204 explaining that bill expenditures are hidden from two types of views. In this example, bill expenses are classified as a recurring transaction (a type of non-discretionary transaction); a user may modify what is classified as a non-discretionary (e.g., recurring) transaction in some embodiments. By removing non-discretionary expenses from visualization, GUI 1200 provides users with greater insight into how they can better take control of their expenses. Since discretionary expenses such as nights-out are more within the control of a user than are non-discretionary expenses such as electricity bills, removing non-discretionary expenses from the visualizations can give new insights to users and aid in understanding of the users' finances.

Discovery of recurring transactions specifically, or non-discretionary transactions generally, can be accomplished via various methods, such as via those involving machine learning based on large sets of a user's transactions. In an implementation, a hardcoded approach that looks specifically for transactions like debits for Bill Pay, etc. can be used. Non-discretionary transaction models may look through lists of a user's past transaction data, and may further factor in the merchant name (the transaction description), the amount, and closeness to a known period (weekly, biweekly, monthly, quarterly, yearly, semimonthly, first of the month, last of the month, and others). These models may also have a given forgiveness range, since a bill may fluctuate a certain amount month to month, or may be paid within a few days of the exact month, give or take. Unexpectedly large fluctuations may be used for other purposes, such as sending an email to the users to give them a heads up about a larger-than-usual bill they were charged. In some implementations, the transactions that are determined to be non-discretionary may then be presented to the user in a simple interface that allows them to confirm or edit the recurrence details, cancel false positives, and add any non-discretionary transactions that may have been missed altogether. These user-corrections may also be used to train and improve the non-discretionary transaction models.

Figure 13:
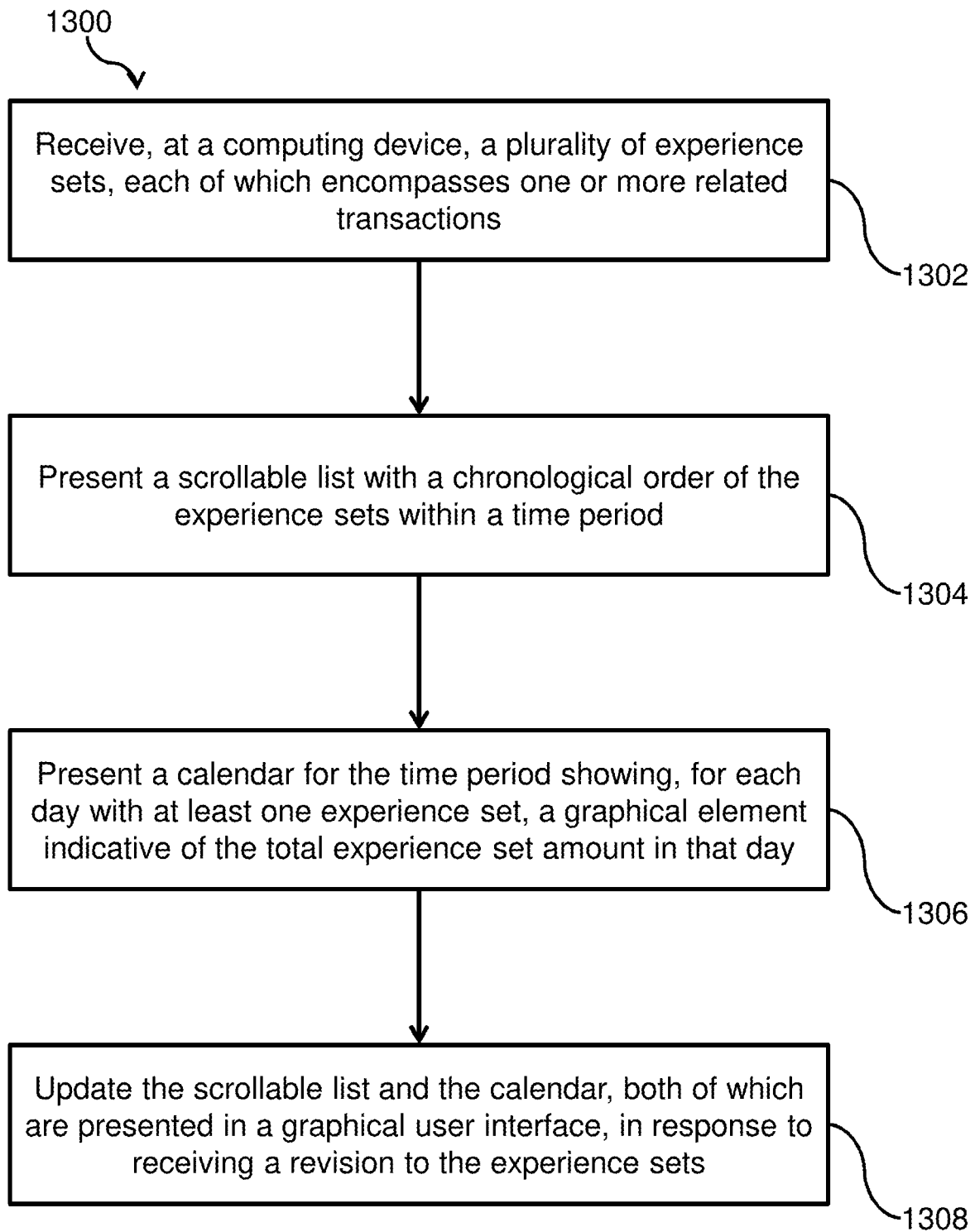
FIGS. 13-16 are flow diagrams showing processing that may occur within a system for managing transactions from a financial services computer network, according to some embodiments of the present disclosure.

FIG. 13 shows a method for improved visualization of transaction data from financial services computer network, according to some embodiments of the present disclosure. Method 1300 may be implemented within a user device, such as user device 230 shown in FIG. 2. At block 1302, a computing device may receive one or more experience sets that have occurred within a time window, for example from a server, and at block 1304, present a scrollable list of the experience sets, for example as shown in FIG. 8. The scrollable list may be reverse chronological, so that the newest experience set is above the others (e.g., experience set having experience set name 806 in FIG. 8). It may also be forward chronological. In addition, as shown in block 1306, the computing device may present a calendar for the same time period, and in the calendar, it may show graphical elements that indicate the total amounts spent for the experience sets in their respective days (e.g., in FIG. 8, calendar 802). In response to a change, such as the addition of one or more new experience sets or a change in the date window, the computing device may update the scrollable list and the calendar (block 1308). The shown method and its various implementations allow a user to visualize expense categories that are meaningful to a customer, rather than to a merchant. This is, in part, due to the grouping of transactions with precise authorization data (e.g., time, place) by the independent experience matchers into meaningful experience sets. As such, the methods enable a user to interactively visualize how a particular experience set fits into his/her overall spending pattern.

Figure 14:
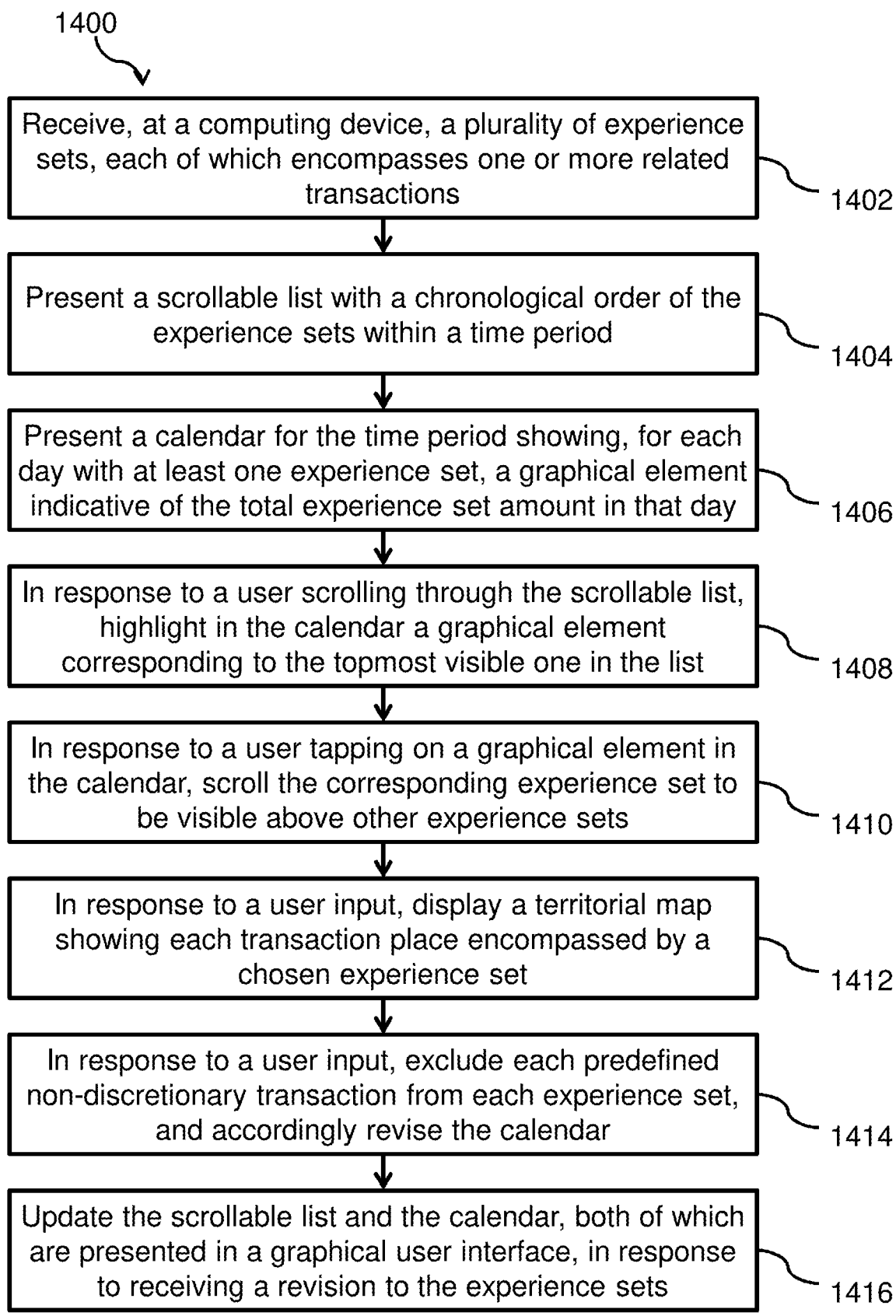

FIG. 14 shows another method 1400 for improved visualization of transaction data, according to embodiments of the present disclosure. Method 1400 can be implemented in a user device. Once a user device receives one or more experience sets (block 1402), it may present them at block 1404 in a scrollable list, and at block 1406 in a calendar with graphical elements (such as graphical elements 606 shown in FIG. 6). In response to a user scrolling through the scrollable list, the user device may highlight in the calendar a graphical element that corresponds to the day for the topmost date in the scrollable list (block 1408) Similarly, in response to a user choosing an element in the calendar (e.g., by tapping on it, by clicking on it, by hovering on it), the user device may scroll the corresponding date with experience sets to the top of the viewable area of the scrollable list (block 1410). Furthermore, in response to a user input, the user device may display a territorial map for the constituent transactions of a chosen experience set (block 1412). The user device may also exclude all non-discretionary (e.g., recurring) transactions from view in response to a user input (block 1414). Additionally, the user device may modify both the scrollable list and the calendar schematic in response to receiving a revision to the experience sets that requires a modification for correct display (block 1416).

A person skilled in the art will understand that the shape, sizes, and/or style of the graphical elements, such as graphical elements 606 shown in FIG. 6, can be varied in order to convey information about experience sets and categories (e.g., type and amount information).

Figure 15:
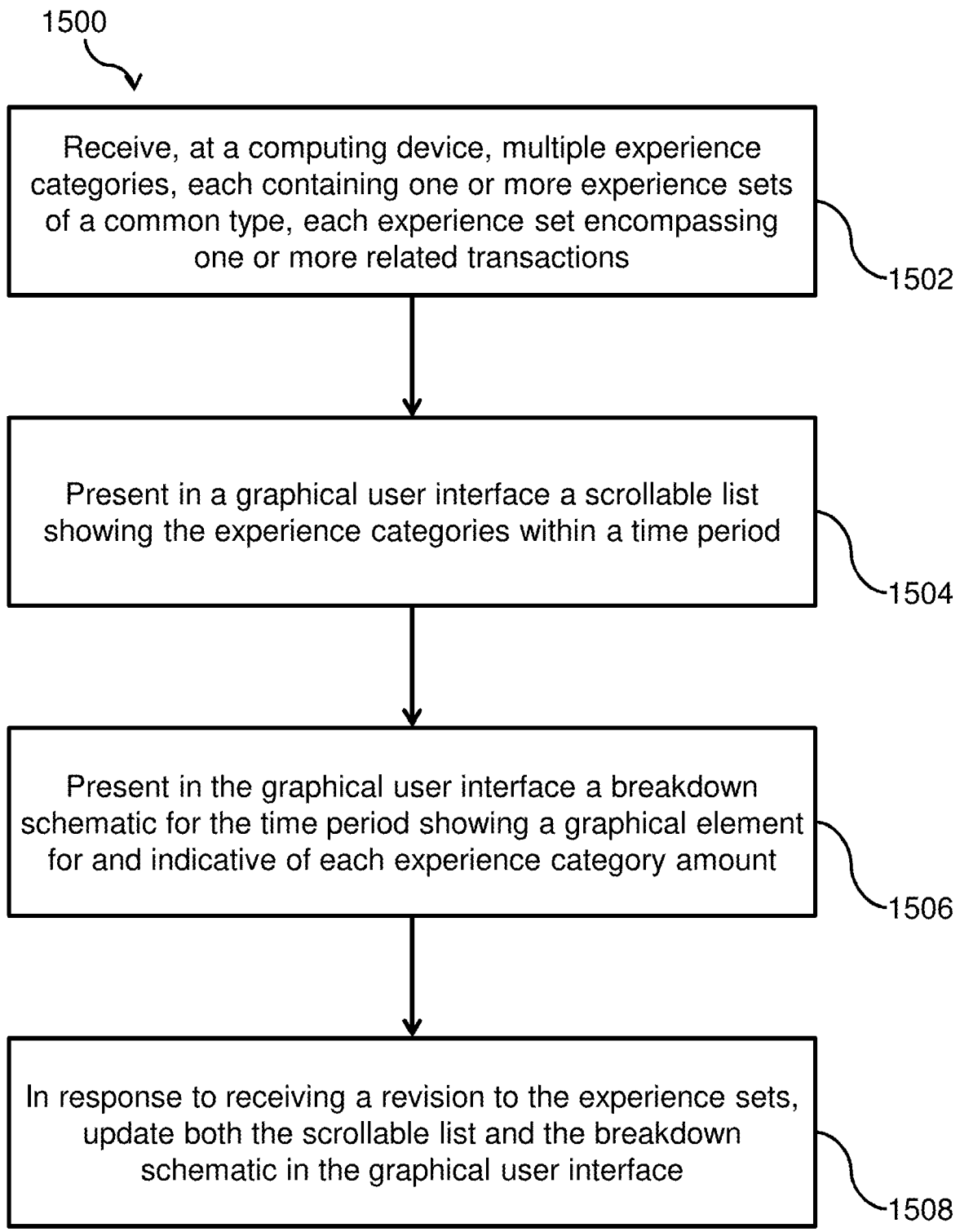

FIG. 15 shows method 1500 for humanizing presentation of transaction data from a financial services computer network, according to some embodiments of the present disclosure. Method 1500 may be implemented in a user device, such as user device 310 shown in FIG. 3. At block 1502, user device may receive multiple experience categories, each containing one or more experience sets. The user device may present in a GUI a scrollable list of the categories at block 1504, and may present a breakdown schematic with graphical symbols for each category at block 1506. Each of blocks 1504 and 1506 may be for a time period. At block 1508, the user device may update both the scrollable list and the breakdown schematic in response to a revision to the experience set categories. The shown method and its various implementations enable users to visualize their experience set types, which of such experience set types they spend the most on, and what particular transactions each experience set has in a given time frame. The processing of individual transactions by the multiple independent experience matchers, coordinated by the transaction hub, enables creation of experience sets, which further allows collections of experience set types, for example by the transaction hub or even by a user device, to be generated and displayed for providing insights to a user.

Figure 16:
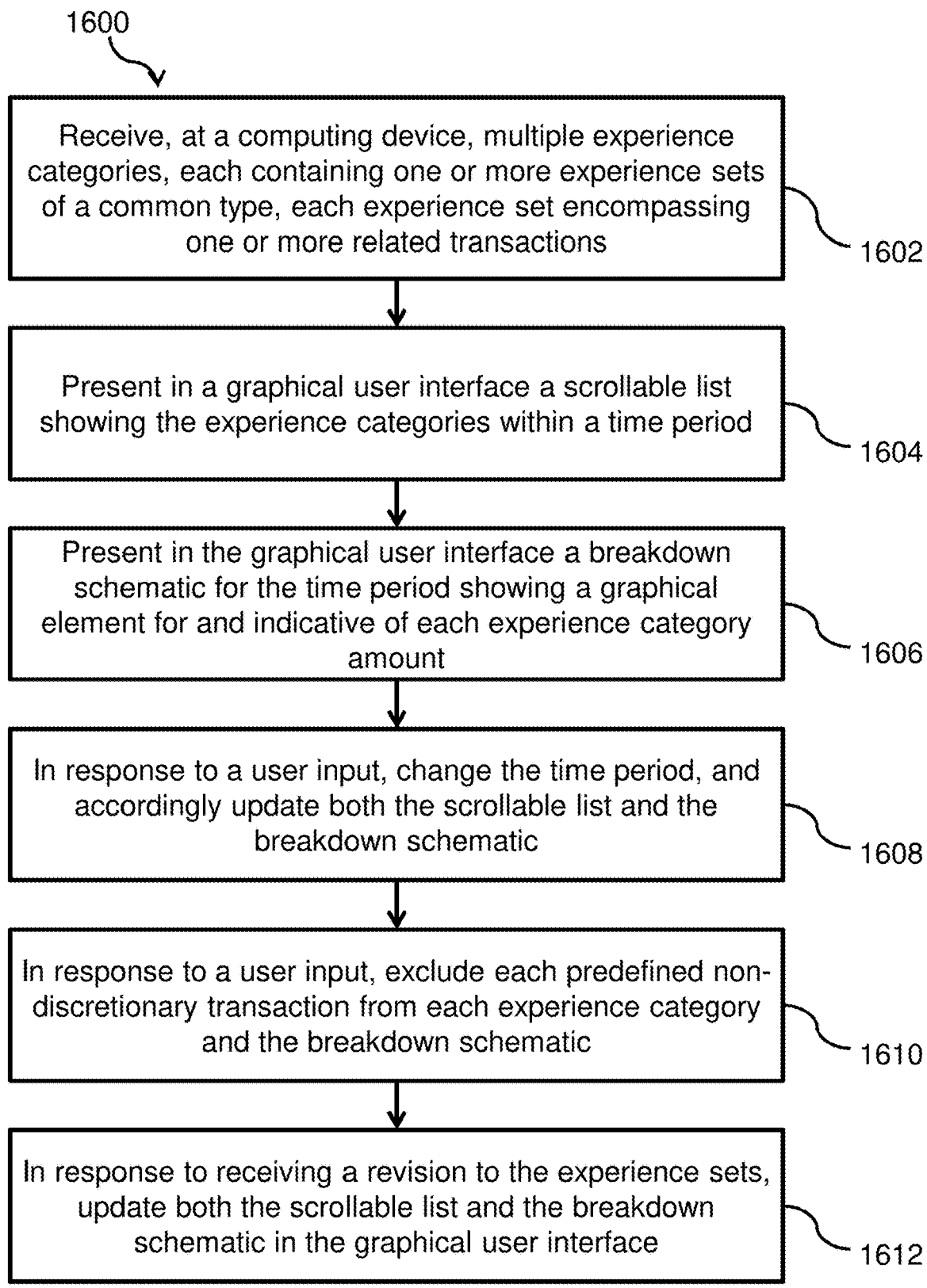

FIG. 16 shows process 1600 for visualizing transaction data, according to some embodiments of the present disclosure. Method 1600 may be implemented in a user device, such as user device 310 shown in FIG. 3. At block 1602, a user device may receive multiple experience categories, and at block 1604 the user device may present a GUI having a scrollable list of the categories. Additionally, the user device may present in the GUI a breakdown schematic with graphical elements that correspond to the categories (block 1606). Blocks 1604 and 1606 reference a time period, which is the time period during which the experience sets of the experience categories occur, and which may be a preset or selected time period. The time period may be changed by a user and, upon such a change, at block 1608, the scrollable list and the breakdown schematic may be updated. At block 1610, in response to user input, the user device may exclude the predefined non-discretionary (e.g., recurring) transaction for each experience category and the breakdown schematic. At block 1612, upon receiving other types of revisions, such as those to the experience sets or experience categories, the user device may modify the scrollable list and the breakdown schematic to reflect the revisions.

Figure 17A:
FIGS. 17A-17L illustrate GUIs for improved management of transaction data from a financial services computer network when some of the transactions are made over non-contiguous periods of time, according to some embodiments of the present disclosure.

Referring to FIGS. 17A though 17N, an experience set may encompass transactions that are made over non-contiguous periods of time, meaning the constituent transactions of an experience set may be, in a chronological list of individual transactions, interspersed with other transactions that are not part of the same experience set. FIGS. 17A though 17N illustrate grouping non-contiguous transactions into experience sets, according to some embodiments of the present disclosure. The GUIs shown in these figures can be implemented in a user device, such as user device 230 of FIG. 2.

Figure 17B:
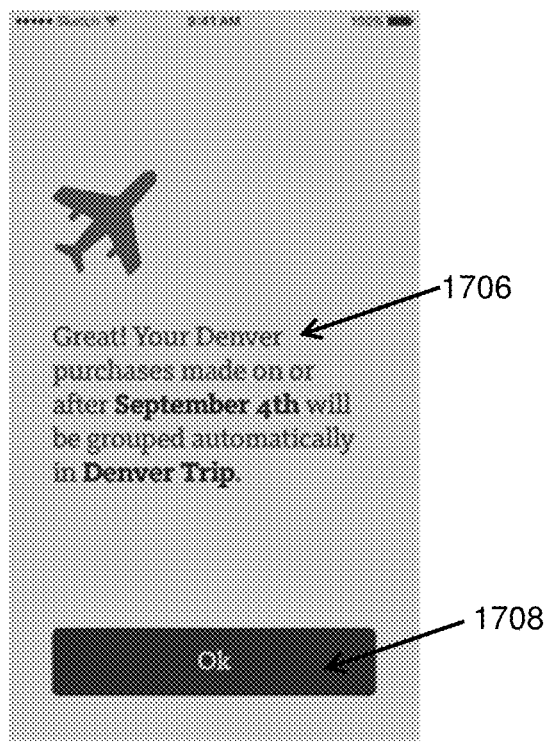

Referring to FIGS. 17A and 17B, a GUI may be displayed to a user when the server, such as server 202 shown in FIG. 2, detects that the user has made a transaction associated with an event that is to occur at a date later than the transaction (at "target date"), as further described in the rest of this disclosure. For example, a transaction corresponding to the purchase of a plane ticket on the first day of a month might be for a flight that is to occur on the nineteenth of the same month, in which case the event is the flight, and the target date is the nineteenth of the month. This type of transaction (such as the purchasing of a plane ticket in the above example) is referred to herein as a "trigger transaction." If the trigger transaction is a purchase, it may also be referred to herein as a "trigger purchase." The illustrative GUI can include query message 1702, a first control 1704*a* for a user to approve grouping the trigger transaction, and a second action control 1704*b* for a user to reject grouping the trigger transaction. In the shown example, the trigger purchase is a booking of a flight for a later date ("September 4$^{th}$"). Other types of trigger transactions may include purchasing or booking a cruise, a train ride, a bus ride, a rental car, an event space, a hotel room, a motel room, or a hostel space. User research or machine learning may lead to the discovery of more trigger transactions in the future, which may be added to the methods and systems disclosed herein. As shown in FIG. 17B, when a user approves booking the trigger transaction with associated future transactions, explanatory message 1706 confirms that decision, and control 1708 allows the user to close the message.

Figure 17C:
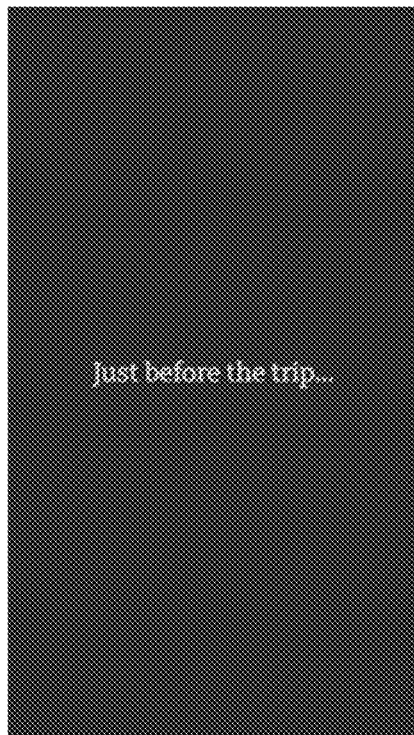
Figure 17D:
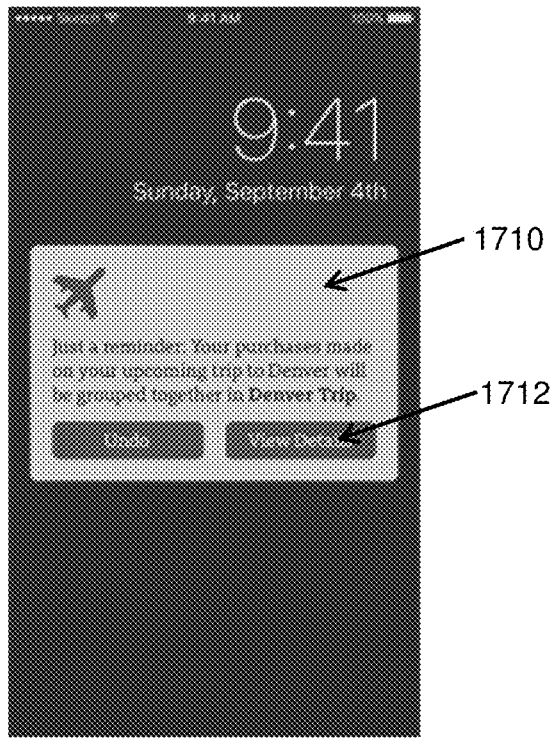
Figure 17E:
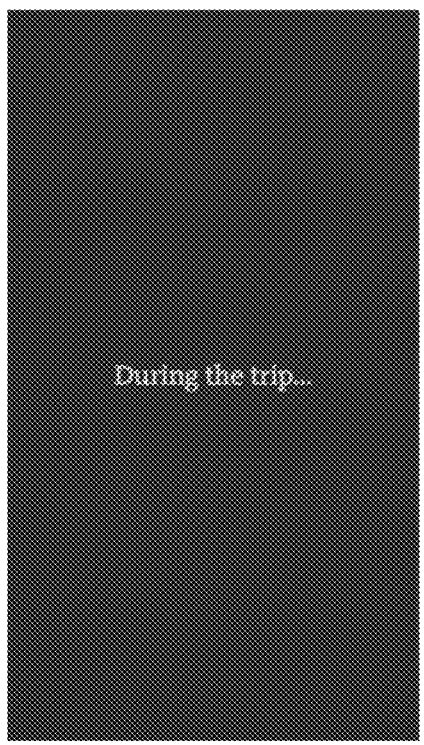
Figure 17F:
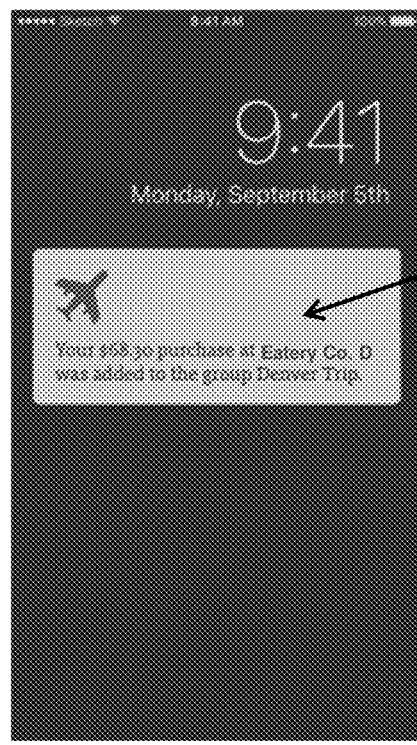
Figure 17G:
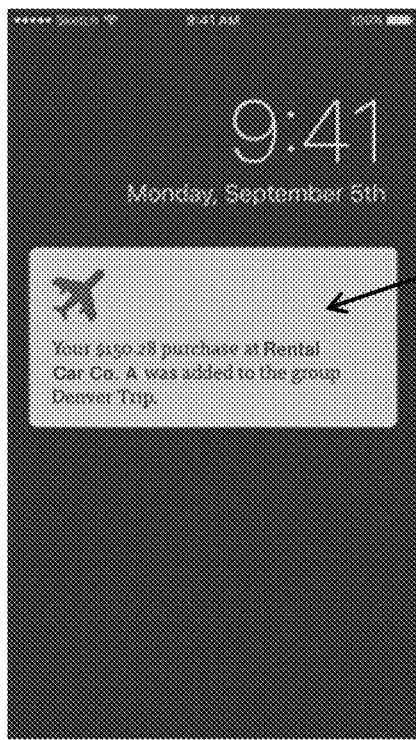
Figure 17H:
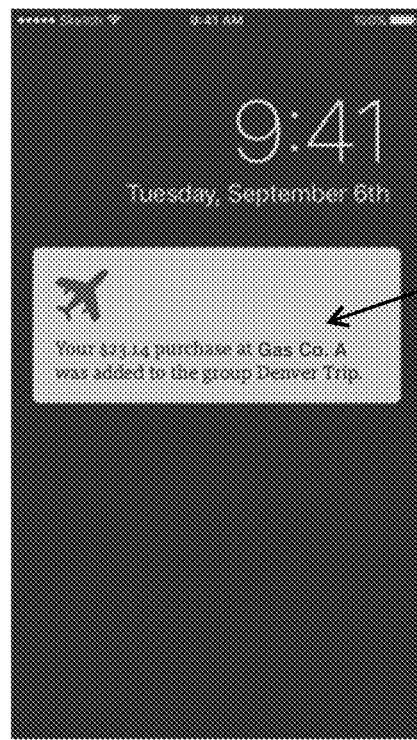
Figure 17I:
Figure 17J:
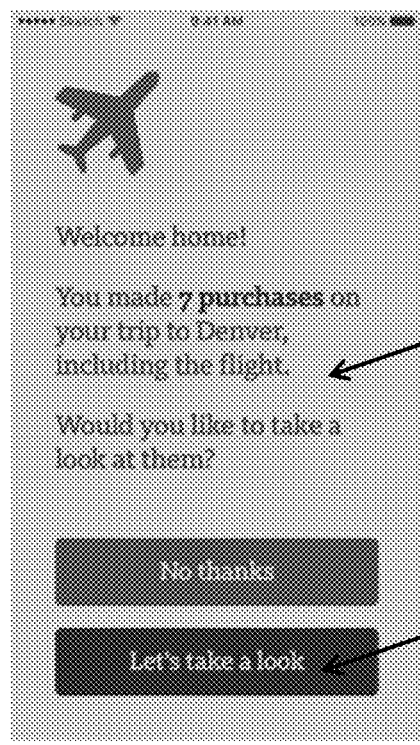
Figure 17K:
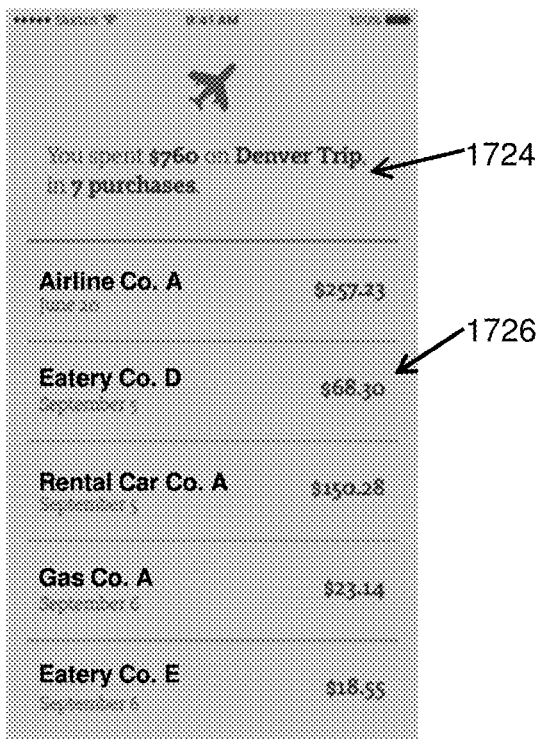
Figure 17L:
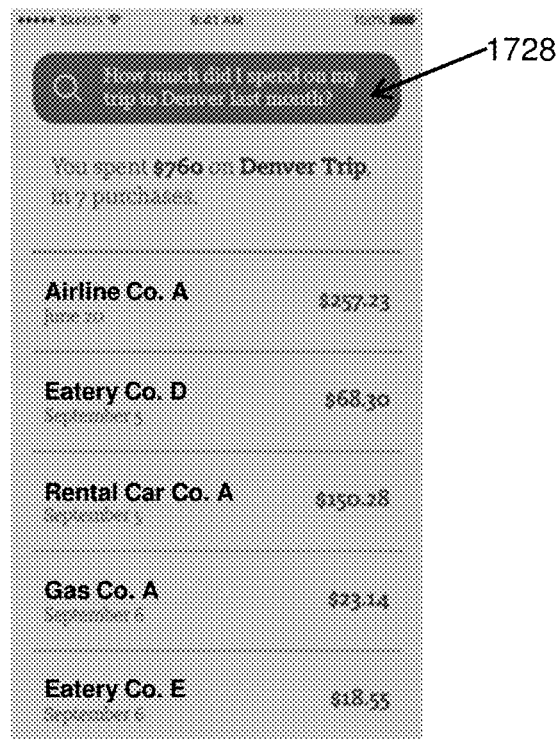

Referring to FIGS. 17C and 17D, in some embodiments, the user device may display reminder message 1710, and allow a user to see further details by clicking on control 1712.

Referring to FIGS. 17E-17H, in some embodiments, during the trip, informational messages 1714, 1716, and 1718 may inform the user that certain purchases have been added to the experience set associated with the initial trigger purchase (e.g., flight booking in this case).

Referring to FIGS. 17I-17L, after the experience comes to an end, explanatory message 1720 may provide a brief summary of the experience and control 1722 may allow a user to view further details regarding the experience. The further details of the experience may include a name for the experience set, such as experience set name 1724 and constituent transactions such as transaction 1726, which is displayed with its date and amount in this example. The ending of an experience may be detected either in response to a user input, based on external data (e.g., through email scraping), through trigger purchase details (e.g., return flight booking), or through another subsequent transaction indicating that the experience is over (e.g., a local purchase made at home town away from the trip location). The summary of the experience, such as its experience set name and constituent transactions, may also be displayed in response to a typed or voiced language query by a user, such as by query 1728.

In some embodiments, if the longest interval between any two transactions in an experience set is less than a predetermined threshold (e.g., 6 hours, 1 day, 2 days, 1 week), then instead of relying on detection of a trigger transaction, any of the other methods described herein may also be used to group transactions (with other unrelated transactions interspersed between them) into experience sets.

Figure 18:
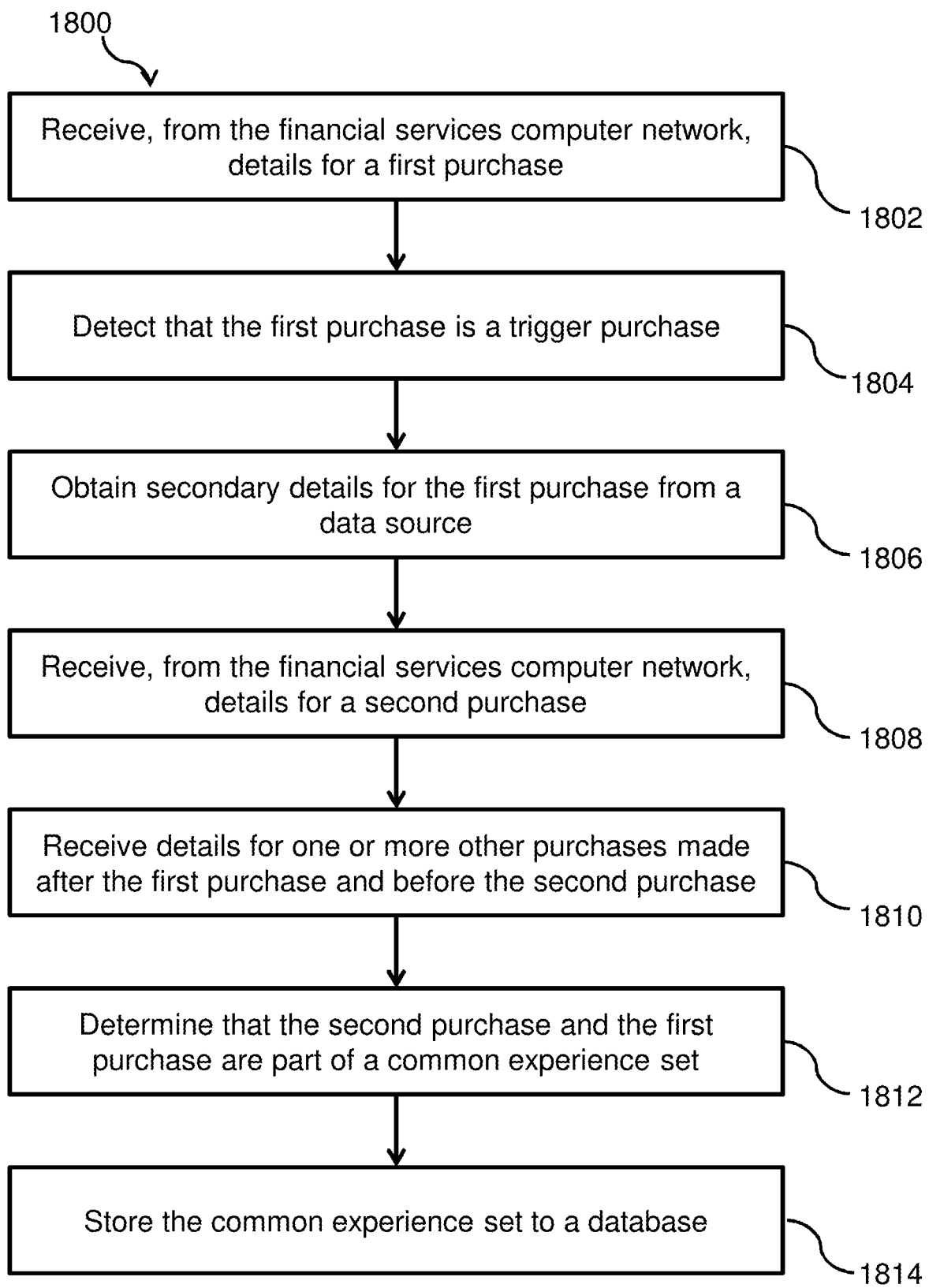
FIGS. 18-20 are flow diagrams showing processing that may occur within a system for managing transactions from a financial services computer network, according to some embodiments of the present disclosure.

FIG. 18 shows method 1800 for improved management of transaction data from a financial services computer network, according to some embodiments of the present disclosure. Method 1800 may be implemented within a server with a server architecture, such as server architecture 380 shown in FIG. 3. At block 1802, a server may receive details for a first purchase, for example via importer 360 shown in FIG. 3, and at block 1804, detect that it is a trigger purchase. The detection of a purchase as a trigger purchase may be done at an experience matcher, such as an experience matcher 340 shown in FIG. 3 after transaction hub 330 sends the transaction to the experience matcher. For example, a non-contiguous experience matcher might be configured to match transactions with certain MCCs (e.g., those corresponding to or including purchasing or booking a cruise, a train ride, a bus ride, a rental car, an event space, a hotel room, a motel room, or a hostel space) or transactions with certain merchants (e.g., travel agents, hotels) and flag such transactions as trigger transactions for initiating an experience set that would, after an interval following the trigger transaction, continue with additional transactions. At block 1806, the server may obtain secondary details for the first purchase from a data source. The data source may be a third party supplier, such as a flight booking information supplier, or it may be an authorized email scraping application. The secondary details may include a target date on which an event with which the trigger transaction is associated is going to happen. For example, for a plane ticket purchase, the trigger transaction is the ticket purchase, the event is the flight, and the target date is the date of the flight. The secondary details may also include other details that are less directly associated with the trigger transaction, such as details that a user may have planned about what attractions the user will visit after the flight and when the user will take a return flight. After the first purchase, the server may receive details for one or more other unrelated purchases (block 1810) and details for a second purchase made subsequent to the one or more other unrelated purchases (block 1808). Using the details for the first purchase, secondary details for the first purchase, or both, the server may determine that the second purchase and the first purchase should be classified as part of a common experience set (block 1812), while the intervening other transactions are not part of the common experience set. For example, if a transaction received by the non-contiguous experience matcher has a date that is not within the expected event or experience date range (e.g., before the target date, after the expected completion date of the experience), then the non-contiguous experience matcher may exclude such a transaction from the non-contiguous experience set. On the other hand, if the second purchase has details that conform to the expected details for purchases that belong to the non-contiguous experience set, then the second purchase may be classified by the non-contiguous experience matcher as being part of the same experience set as the first purchase. The server may store the common experience set (e.g., including its attributes, such as its constituent transactions) to a database (block 1814). In some embodiments, additional purchases after the second purchase may also be added to the common experience set.

As one particular example of the processing shown in FIG. 18, on a start date, an importer may receive a transaction corresponding to the purchasing of a plane ticket. This transaction may be sent by a transaction hub to one or more experience matchers, out of which, an experience matcher configured to detect trigger transactions would detect it as a trigger transaction, indicating that it is for an event that will occur on a future date. The experience matcher may perform the matching via comparing the transaction attributes, such as its MCC, its merchant name, its name, and/or its description to pre-determined trigger transaction attributes, which may be stored in a database. The trigger transaction attributes may be accessed by the experience matcher or by the transaction hub (e.g., transaction hub may send the trigger transaction attributes to the experience matchers). Once the detection of a transaction as a trigger transaction, the plane ticket in this case, is made, information for the associated experience set may be stored in a database by the transaction hub. The stored experience set, at that time, would contain the trigger transaction as a constituent transaction, and it would be open for inclusion of other transactions at a later time. The method may then include obtaining secondary details for the plane ticket purchase, for example from TSYS, which may provide information about original flight (e.g., date, airport) and return flight (e.g., date, airport). From these secondary details, the transaction hub may flag the experience set to be updated with additional transactions—pending the testing of these transactions though the experience matchers—during the expected date range. Once the target date is reached for the originating flight, the transaction hub may initiate sending the transactions that it receives from a financial services computer network to a collection of experience matchers that includes one or more experience matchers configured to detect transactions that belong to the non-contiguous experience set. In some embodiments, transaction hub may keep track of experience sets that are expected to accrue additional transactions, and coordinate sending a list of transactions to all experience matchers, or those specifically including/excluding experience matchers that detect trigger transactions or follow-on transactions, based on the secondary details such as date ranges expected for experience sets. In some embodiments, an experience matcher (e.g., one designed for detecting trigger transactions, one designed to detect follow-on transactions, or one designed to detect both trigger and follow-on transactions) may keep track of what experience sets may include non-contiguous transactions and which ones may accrue additional transactions.

Figure 19:
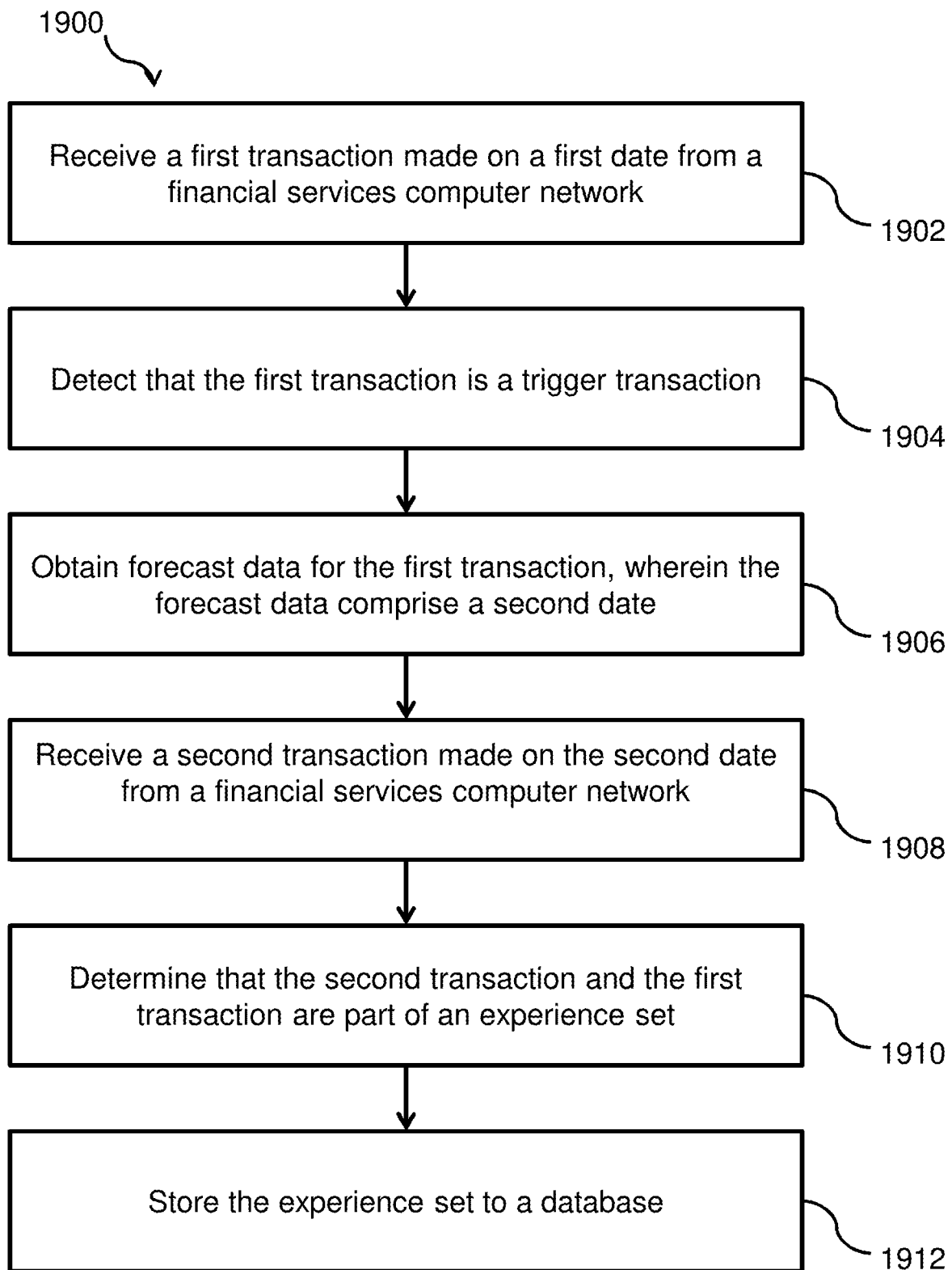

FIG. 19 shows method 1900 for improving categorization of transactions by money-management software, according to some embodiments of the present disclosure. Method 1900 may be implemented within a server, such as server 202 shown in FIG. 2. At block 1902, server may receive a first transaction from a financial services computer network, and after detecting that it is a trigger transaction (e.g., the first of a set of transactions that form a common experience set) at block 1904, it may obtain associated forecast data at block 1906. The forecast data may include a target date predicting when the second transaction of the experience set will occur. On the target date, at block 1908, the server may receive a second transaction and at block 1910, it may determine that the two transactions are part of a common experience set (e.g., by comparing their details and also by using the forecast data). At block 1912, the server may store the experience set to a database.

As one example of improving categorization of non-contiguously occurring transactions, the following may be implemented, for example with respect to processing that occurs in an experience matcher configured to detect both a trigger transaction and follow-on transactions that belong to the same experience set as the trigger transaction. In some embodiments, more than one experience matcher may be involved (e.g., one for detecting trigger transactions and one for detecting follow-on transactions). Once a transaction is received by the experience matcher, the experience matcher may check that the transaction has one of a certain set of MCCs, for example those that correspond to the purchasing of various tickets or remote accommodations. The experience matcher may also check that the merchant for the transaction is one of a certain set of merchants, such as ticket vendors or hotels. The list of MCCs and merchants may be stored in an accessible database or received from a transaction hub. Once a match is found, the transaction may be classified as a trigger transaction. Then, the experience matcher may receive secondary details for the trigger transaction from the transaction hub, which in turn may receive them from an external data source, such as an email scraping application authorized by the user. The secondary details may include a target date for the occurrence of the event associated with the trigger transaction, and may further include an end date for the conclusion of the user's plans that relate to the event. Thereafter, follow-on transactions may be received by the experience matcher. If those transactions have details that do not match the secondary details of the trigger transaction (e.g., being between the target date and the end date, being at or around the event location), then those transactions are classified as not being part of the same experience set as the trigger transaction. On the other hand, if some follow-on transactions have details that match the secondary details of the trigger transaction, then those follow-on transactions may be classified as being part of the same experience set as the trigger transaction. Multiple follow-on transactions may be added to the experience set until a terminating condition, such as reaching the end date, occurs.

Figure 20:
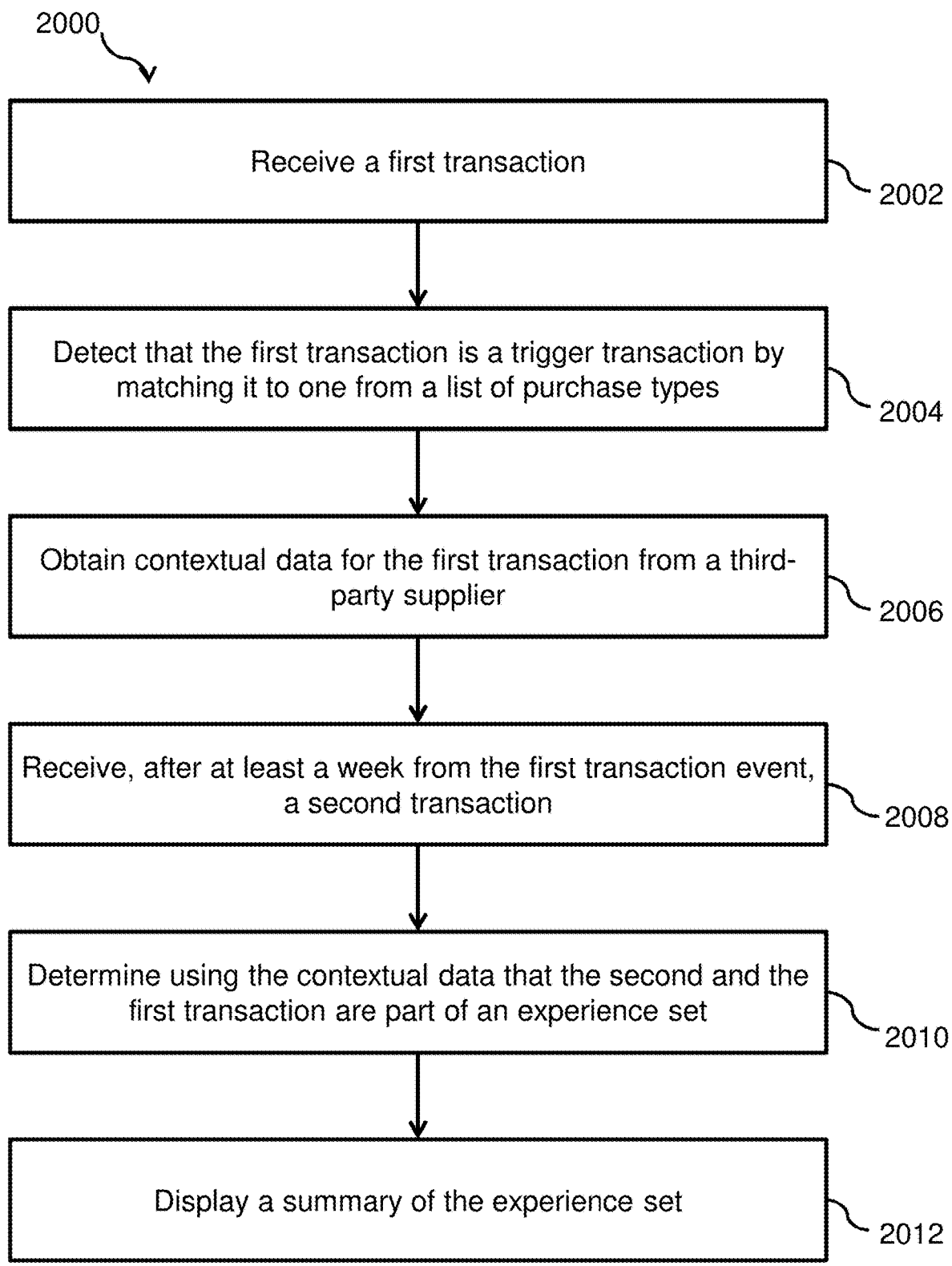

FIG. 20 shows method 2000 for forming an experience set from a plurality of transactions, which can be implemented within a non-transitory computer readable medium (e.g., of a server), according to some embodiments of the present disclosure. Method 2000 may include receipt of a first transaction at block 2002, for example from a financial services computer network via an importer into a transaction hub, and then a detection that the transaction is a trigger transaction at block 2004, for example through processing done within an experience matcher. This detection may be made by matching the transaction type to a list of transaction types (e.g., plane tickets, hotel bookings), which types may be stored within a database accessible by one or more experience matchers or may be supplied to the experience matchers from the transaction hub, which itself may access the types from a database. At block 2006, contextual data may be obtained for the first transaction though a third-party supplier, such as a travel booking agent information provider, and at block 2008, a second transaction may be received. It may be determined at block 2010 that the two transactions are part of the same experience set, for example because an experience matcher has detected that the details for the second transaction (e.g., its date, location, MCC) match what has been expected based on the contextual data and the first transaction (e.g., the first transaction indicated an event on a second date, the contextual data indicated that the plans of the user include staying at a location after the second date until a third date for certain activities, and the second transaction has a date that is between the second date and the third date, occurs within the location, and has an MCCs that is within a predetermined list of MCCs that have been associated with the activities expected from the user). Then, the experience set summary may be displayed according to the executable instructions of the computer readable medium. As an example of contextual data, a third supplier may provide information regarding a flight purchase such as each leg of the flight, departure date, as well as origin and destination airports for each leg.

Methods described herein may represent processing that occurs within a system for managing transactions from a financial services computer network, such as system 200 shown in FIG. 2. The subject matter described herein may be implemented in digital electronic circuitry, in computer software, in firmware, or in computer hardware, including the structural means disclosed in this specification and their structural equivalents. The subject matter described herein can be implemented as one or more computer program products, such as one or more computer programs tangibly embodied in an information carrier, such as a machine-readable storage device, for execution by or control of the operation of data processing apparatus, such as programmable processor or one or more computers. A computer program, software, application, or code can be written in any form of programming language (e.g., compiled, interpreted) and it can be deployed in any form (e.g., stand-alone program, module, component, subroutine, other unit suitable for use in computing environment). A computer program need not correspond to a file, can be stored in a portion of a file, can be stored in a single dedicated file, or can be stored across multiple files. A computer program can be deployed to be executed on one computer or on multiple computers at one site or can be distributed across multiple sites (e.g., as interconnected by a communication network).

The processes and logic flows described in this specification, including the method steps of the subject matter described herein, can be performed by one or more programmable processors executing one or more computer programs to perform functions of the subject matter described herein buy operating on input data and generating output. The processes and logic flows can also be performed by, and apparatus of the subject matter described herein can be implemented as, special purpose logic circuitry, such as a field programmable gate array or an application specific integrated circuit.

Processors suitable for the execution of a computer program include both general and special purpose microprocessors, as well as any one or more processors of any kind of digital computer. Generally, a processor will receive instructions and data from a read-only memory, a random-access memory, or both. The standard elements of a computer are a processor for executing instructions and one or more memory devices for storing instructions and data. Generally, a computer will also include, and/or be operatively coupled to receive data from or transfer data to, one or more mass storage devices for storing data, such as magnetic disks, magneto optical disks, or optical disks. Information carriers suitable for embodying computer program instructions and data include all forms of nonvolatile memory, including semiconductor memory devices such as EPROM, EEPROM, flash memory devices, and magnetic disks. The processor and the memory can be supplemented by or incorporated in special purpose logic circuitry.

The disclosed subject matter is not limited in its application to the details of construction and to the arrangements of the components set forth in the specification or illustrated in the drawings. The disclosed subject matter is capable of being implemented in other embodiments and of being practiced and carried out in various ways. Those skilled in the art will appreciate that the conception, upon which this disclosure is based, may be described using different phraseology and terminology and may readily be utilized as a basis for the designing of other structures, methods, and systems for carrying out the several purposes of the disclosed subject matter.

Although the disclosed subject matter has been described and illustrated by way of example in the foregoing exemplary embodiments, numerous changes in the details of the implementation of the disclosed subject matter may be made without departing from the spirit and scope of the disclosed subject matter.

What is claimed is:

1. A system for managing transactions from a financial services computer network, the system comprising:
   a database;
   one or more processors;
   a plurality of experience matchers, each of the experience matchers being associated with a different experience set type, each of the experience matchers being configured for execution by the one or more processors to:
   receive a list of transactions;
   identify, by searching within the list of transactions, an experience set having an experience set type;
   identify a set of the transactions as being encompassed by the experience set based on one or more of a location or time associated with the transaction; and
   return the identified experience set; and
   a transaction hub configured for execution by the one or more processors to:
   receive a transaction stream from the financial services computer network;
   send the list of transactions generated from the transaction stream to the plurality of experience matchers;
   receive a first identified experience set from a first of the experience matchers and a second identified experience set from a second of the experience matchers based on the list of transactions;
   in response to the first identified experience set and the second identified experience set sharing at least one of the transactions, analyze, by a machine learning model the shared transaction, the first identified experience set, the second identified experience set, and historical transactions and experience sets of the user, the machine learning model being trained to prioritize allocation of transactions to experience sets on a per user basis by learning a hierarchy of experience sets;
   choose, by the machine learning model, one of the first identified experience set or the second identified experience set to be associated with the shared transaction;
   assign the shared transaction to the chosen experience set; and
   store the chosen experience set in the database,
   wherein the one or more processors are configured to provide transaction details associated with the chosen experience set for display to a user in a graphical user interface;
   wherein the one or more processors continuously update the machine learning model by retraining the machine learning model with the assignment of the shared transaction and the chosen experience set.

2. The system of claim 1, wherein each of the experience matchers is configured for execution by the one or more processors to further determine, and return to the transaction hub, a match score for an identified experience set.

3. The system of claim 2, wherein the transaction hub is configured for execution by the one or more processors to further prioritize allocation of a transaction into an identified experience set based on the match score.

4. The system of claim 2, wherein the match score is determined based on at least one of a transaction time range, transaction merchant codes, transaction physical proximity, transaction temporal proximity, or a combination thereof.

5. The system of claim 1, wherein each of the experience matchers is configured for execution by the one or more processors to perform a search and return operation in real time with a delay of less than ten minutes after receiving the list of transactions.

6. The system of claim 1, wherein the transaction hub is configured for execution by the one or more processors to receive the transaction stream in real time with a delay of less than ten minutes after a transmittal of a new transaction to be appended to the list of transactions.

7. The system of claim 1, wherein the system is configured to be modified by addition of new experience matchers.

8. The system of claim 7, wherein the new experience matchers are created based on user input.

9. The system of claim 7, wherein the new experience matchers are created by the machine learning model, the model including at least one of continuous learning, reinforcement learning, or retraining, wherein the machine learning model is configured to update an existing experience matcher to create a new experience matcher.

10. A computer-implemented method for forming an experience set from a transaction list from a financial services computer network, the method comprising:
    obtaining by a transaction hub a past transaction list from the financial services computer network;
    receiving by the transaction hub a transaction from the financial services computer network;
    updating by the transaction hub the past transaction list into a current transaction list by adding in the received transaction;
    sending by the transaction hub the current transaction list to each of a plurality of experience matchers;
    analyzing by each of the experience matchers the current transaction list to identify in each of the experience matchers, by searching within the list of transactions, an experience set having an experience set type;

identifying a set of the transactions as being encompassed by the experience set based on one or more of a location or time associated with the transactions; and receiving by the transaction hub a first identified experience set from a first of the experience matchers and a second identified experience set from a second of the experience matchers based on the list of transactions;

in response to the first identified experience set and the second identified experience set sharing at least one of the transactions, analyzing by a machine learning model the shared transaction, the first identified experience set, the second identified experience set, and historical transactions and experience sets of the user, the machine learning model being trained to prioritize allocation of transactions to experience sets on a per user basis by learning a hierarchy of experience sets;

choosing, by the machine learning model, one of the first identified experience set or the second identified experience set to be associated with the shared transaction;

assigning the shared transaction to the chosen experience set;

storing the chosen experience set by the transaction hub in a database;

providing transaction details associated with the chosen experience set for display to a user in a graphical user interface; and continuously updating the machine learning model by retraining the machine learning model with the assignment of the shared transaction and the chosen experience set.

11. The method of claim 10, wherein the current transaction list contains transactions from a predetermined time range.

12. The method of claim 11, wherein the time range is thirty days.

13. The method of claim 10, wherein the received transaction is received in real time with a delay of less than ten minutes.

14. The method of claim 10, wherein the received first identified experience set is received in real time with a delay of less than ten minutes.

15. The method of claim 10, further comprising receiving from each of the experience matchers a match score.

16. The method of claim 15, wherein the match score is determined based on transaction time, transaction type, transaction distance, and transaction interval.

17. The method of claim 10, further comprising revising the plurality of experience matchers.

18. The method of claim 10, further comprising revising the first experience matcher to identify a different experience set.

19. The method of claim 18, wherein the different experience set is created by the machine learning model, the model including at least one of continuous learning, reinforcement learning, or retraining, wherein the machine learning model is configured to update an existing experience matcher to create the different experience matcher.

20. A system for generating a humanized experience set from a list of transactions from a financial services computer network, the system comprising:

a transaction database;

one or more processors;

a transaction hub configured for execution by the one or more processors to:

receive a transaction stream from the financial services computer network in real time with a delay of less than ten minutes after a recent transaction;

send a list of transactions generated from the transaction stream to a plurality of experience matchers;

receive a first identified experience set from a first of the experience matchers and a second identified experience set from a second of the experience matchers based on the list of transactions;

in response to the first identified experience set and the second identified experience set sharing at least one of the transactions, analyze, by a machine learning model the shared transaction, the first identified experience set, the second identified experience set, and historical transactions and experience sets of the user, the machine learning model being trained to prioritize allocation of transactions to experience sets on a per user basis by learning a hierarchy of experience sets;

choose, by the machine learning model, one of the first identified experience set or the second identified experience set to be associated with the shared transaction;

assign the shared transaction to the chosen experience set; and store the chosen identified experience set in the transaction database; and the plurality of independent experience matchers, each of which has instructions executable by the one or more processors to:

receive the list of transactions from the transaction hub;

analyze the list of transactions to identify, by searching within the list of transactions, an experience set having an experience set;

identify a set of the transactions as being encompassed by the experience set based on one or more of a location or time associated with the transaction; and return the identified experience set to the transaction hub, wherein each of the plurality of independent experience matchers are configured to run as separate instances on a server;

wherein the one or more processors are configured to provide transaction details associated with chosen experience set for display to a user in a graphical user interface;

wherein the one or more processors continuously update the machine learning model by retraining the machine learning model with the assignment of the shared transaction and the chosen experience set.

* * * * *